(12) United States Patent
Chai et al.

(10) Patent No.: US 12,395,983 B2
(45) Date of Patent: Aug. 19, 2025

(54) UPLINK TRANSMISSION RESOURCE DETERMINING METHOD AND APPARATUS

(71) Applicant: Huawei Technologies Co., Ltd., Shenzhen (CN)

(72) Inventors: Xiaomeng Chai, Shanghai (CN); Yiqun Wu, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 632 days.

(21) Appl. No.: 17/673,471

(22) Filed: Feb. 16, 2022

(65) Prior Publication Data

US 2022/0174703 A1 Jun. 2, 2022

Related U.S. Application Data

(63) Continuation of application No. PCT/CN2019/111543, filed on Oct. 16, 2019.

(30) Foreign Application Priority Data

Aug. 16, 2019 (WO) ................ PCT/CN2019/101154

(51) Int. Cl.
  *H04W 72/1268* (2023.01)
  *H04W 74/0833* (2024.01)
(52) U.S. Cl.
  CPC ... *H04W 72/1268* (2013.01); *H04W 74/0833* (2013.01)
(58) Field of Classification Search
  CPC ........ H04W 72/1268; H04W 74/0833; H04W 74/006; H04L 5/0044; H04L 5/0094; Y02D 30/70

(Continued)

(56) References Cited

U.S. PATENT DOCUMENTS

2019/0069218 A1  2/2019  Ribeiro et al.
2019/0149365 A1  5/2019  Chatterjee et al.
(Continued)

FOREIGN PATENT DOCUMENTS

CN  101252787 A  *  8/2008
CN  102196496 A     9/2011
(Continued)

OTHER PUBLICATIONS

LG Electronics Inc., "General 2-Step RACH procedure," 3GPP TSG-RAN WG1 Meeting #106, Reno, USA, R2-1906555, XP051730016, Total 3 pages, 3rd Generation Partnership Project, Valbonne, France (May 13-17, 2019).

(Continued)

*Primary Examiner* — Khaled M Kassim
*Assistant Examiner* — Oladiran Gideon Olaleye
(74) *Attorney, Agent, or Firm* — Leydig, Voit & Mayer, Ltd.

(57) ABSTRACT

An uplink transmission resource determining method includes: receiving first system information sent by a network device, where the first system information includes a first physical uplink shared channel (PUSCH) resource configuration; determining whether a preset condition is met; receiving second system information sent by the network device when the preset condition is not met, where the second system information includes a second PUSCH resource configuration; and determining, based on the second PUSCH resource configuration, a parameter used for uplink transmission. In this way, a terminal may flexibly select the PUSCH resource configuration in the first system information or the PUSCH resource configuration in the second system information based on a requirement of the terminal. The second system information is received only when the preset condition is not met, to reduce information (Continued)

obtained by the terminal and reduce power consumption of the terminal.

20 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0208550 A1* | 7/2019 | Ko | .......................... H04L 5/0094 |
| 2019/0261337 A1* | 8/2019 | Park | ....................... H04L 5/0094 |

FOREIGN PATENT DOCUMENTS

| | | | | | |
|---|---|---|---|---|---|
| CN | 104041165 A | | 9/2014 | | |
| CN | 104798400 A | | 7/2015 | | |
| CN | 106856628 A | | 6/2017 | | |
| CN | 109040976 A | * | 12/2018 | ........... | H04L 1/0027 |
| CN | 110035536 A | * | 7/2019 | ........... | H04L 1/1861 |
| WO | WO-2014113925 A1 | * | 7/2014 | ........... | H04W 74/006 |
| WO | WO-2015109544 A1 | * | 7/2015 | ........... | H04W 52/281 |

OTHER PUBLICATIONS

Interdigital Inc., "On PUSCH Transmission in msgA," 3GPP TSG RAN WG1 Meeting #96b, Xi'an, China, R1-1904848, XP051699995, Total 6 pages, 3rd Generation Partnership Project, Valbonne, France (Apr. 8-12, 2019).

"3rd Generation Partnership Project; Technical Specification Group Radio Access Network; NR; Physical layer procedures for data (Release 15)," 3GPP TS 38.214, V15.6.0, XP051754328, pp. 1-105, 3rd Generation Partnership Project, Valbonne, France (Jun. 2019).

"3rd Generation Partnership Project; Technical Specification Group Radio Access Network; NR; Physical layer procedures for control (Release 15)," 3GPP TS 38.213, V15.6.0, XP051754327, pp. 1-107, 3rd Generation Partnership Project, Valbonne, France (Jun. 2019).

"Feature lead summary#3 on 2 step RACH procedures," 3GPP TSG RAN WG1 #97, R1-1907900, Reno, USA, pp. 1-59, 3rd Generation Partnership Project, Valbonne, France (May 13-17, 2019).

"PUSCH Configurations for MsgA of 2-step RACH," 3GPP TSG-RAN WG2 Meeting #106, R2-1907047, Reno, USA, Total 3 pages, 3rd Generation Partnership Project, Valbonne, France (May 13-17, 2019).

* cited by examiner

PUSCH transmission unit

PUSCH time-frequency resource configuration 0

PUSCH time-frequency resource configuration 1

PUSCH time-frequency resource configuration 2

PUSCH resource configuration 0   PUSCH resource configuration 1   PUSCH resource configuration 2

UPLINK TRANSMISSION RESOURCE DETERMINING METHOD AND APPARATUS

CROSS-REFERENCE TO RELATED APPLICATIONS

This application is a continuation of International Application No. PCT/CN2019/111543, filed on Oct. 16, 2019, which claims priority to International Application No. PCT/CN2019/101154, filed on Aug. 16, 2019. The disclosures of the aforementioned applications are hereby incorporated by reference in their entireties.

TECHNICAL FIELD

This application relates to the field of communication technologies, and in particular, to an uplink transmission resource determining method and an apparatus.

BACKGROUND

In an existing communication system, due to power saving, limited radio resources, or the like, when a terminal is inactive for a long time, a network device disconnects from an air interface of the terminal. When the terminal needs to retransmit data, the terminal needs to initiate random access. In a conventional technology, to reduce a latency and signaling overheads of random access, a two-step random access solution is proposed in the industry. The two-step random access solution is specifically described as follows: The terminal sends a message A (Msg A) to the network device, and the network device returns a message B (Msg B) to the terminal.

The Msg A may include two parts: a preamble part and a data part. The preamble part in the Msg A is transmitted on a physical random access channel (PRACH), and the data part in the Msg A is transmitted on a physical uplink shared channel (PUSCH).

How to configure a PUSCH resource in a two-step random access technology needs to be further discussed.

SUMMARY

This application provides an uplink transmission resource determining method and an apparatus, to resolve a problem of configuring a PUSCH resource in a two-step random access technology.

According to one aspect, an uplink transmission resource determining method is provided. The method may be performed by a terminal device, and the method specifically includes: receiving first system information sent by a network device, where the first system information includes a first physical uplink shared channel (PUSCH) resource configuration; and determining, based on whether a preset condition is met, to use the first PUSCH resource configuration or receive second system information, where the second system information includes a second PUSCH resource configuration. In this way, in a two-step random access procedure, the terminal may obtain a plurality of PUSCH resource configurations based on a plurality of pieces of system information. In addition, the terminal may determine, based on whether the preset condition is met, whether to use the PUSCH resource configuration in the first system information, or continue to receive the second system information to obtain the PUSCH resource configuration in the second system information. The plurality of PUSCH resource configurations are dispersed in the plurality of pieces of system information, to help reduce load of the first system information.

In an embodiment, it is determined whether the preset condition is met; the second system information sent by the network device is received when the preset condition is not met, where the second system information includes the second PUSCH resource configuration; and a parameter used for uplink transmission is determined based on the second PUSCH resource configuration. In this way, the terminal may flexibly select the PUSCH resource configuration in the first system information or the PUSCH resource configuration in the second system information based on a requirement of the terminal. The second system information is received only when the preset condition is not met, to reduce information obtained by the terminal and reduce power consumption of the terminal.

In an embodiment, the method further includes: determining, based on the first PUSCH resource configuration, a parameter used for uplink transmission when the preset condition is met. When the first PUSCH resource configuration in the first system information may meet an uplink transmission requirement of the terminal, there is no need to continue to receive the second system information, to prevent the terminal from receiving an unnecessary message.

In an embodiment, that a parameter used for uplink transmission is determined based on the second PUSCH resource configuration may be implemented in the following manner: The parameter used for the uplink transmission is determined based on the first PUSCH resource configuration and the second PUSCH resource configuration. When the preset condition is not met, uplink transmission may be performed based on the parameter in the first PUSCH resource configuration and the parameter in the second PUSCH resource configuration.

In an embodiment, the first system information further includes association information of the second system information, and the association information is used to indicate a value range of a parameter of the second PUSCH resource configuration in the second system information. The terminal can more quickly determine, based on the association information, the second system information that should be selected for receiving when the preset condition is not met, to shorten a latency and further avoid a waste of power consumption caused by receiving unnecessary information.

In an embodiment, the preset condition includes: a parameter corresponding to the first PUSCH resource configuration meets a requirement for transmitting to-be-transmitted data. To be specific, when the parameter corresponding to the first PUSCH resource configuration meets the requirement for transmitting the to-be-transmitted data, the parameter used for the uplink transmission is determined based on the first PUSCH resource configuration. When the parameter corresponding to the first PUSCH resource configuration does not meet the requirement for transmitting the to-be-transmitted data, the second system information sent by the network device is received, and the parameter used for the uplink transmission is determined based on the second PUSCH resource configuration.

In an embodiment, the preset condition includes one or more of the following: a modulation and coding scheme (MCS) required for the to-be-transmitted data is less than an MCS corresponding to the first PUSCH resource configuration; a size of the to-be-transmitted data is less than or equal to a TBS corresponding to the first PUSCH resource configuration; or a PUSCH time-frequency resource size required for transmitting the to-be-transmitted data is less than or equal to a PUSCH time-frequency resource size corresponding to the first PUSCH resource configuration.

In an embodiment, the parameter corresponding to the first PUSCH resource configuration may be understood as a parameter included in the first PUSCH resource configuration, or may be understood as a default/predefined parameter used when the first PUSCH resource configuration and the default/predefined parameter together form a PUSCH resource configuration.

In an embodiment, a value range of a value of a parameter required for transmitting to-be-transmitted data is determined; and the second system information associated with the value range is determined based on the association information. The terminal can more quickly determine, based on the association information, the second system information that should be selected for receiving when the preset condition is not met, to shorten a latency and further avoid a waste of power consumption caused by receiving unnecessary information.

In an embodiment, the first PUSCH resource configuration includes a first parameter, and the second PUSCH resource configuration includes a second parameter; and the first parameter and the second parameter have a same parameter type and different values; or the first parameter is of a first parameter type, and the second parameter is of a second parameter type.

In an embodiment, the first PUSCH resource configuration or the second PUSCH resource configuration includes at least one of the following types of parameters: a modulation and coding scheme (MCS), a transport block size (TBS), a PUSCH time domain resource configuration, a PUSCH frequency domain resource configuration, a power control configuration, a mapping relationship between a PRACH transmission occasion RO and a PUSCH transmission occasion PO, a mapping relationship between a preamble and a PUSCH resource unit, a mapping relationship between a PUSCH resource unit and a synchronization signal block (SSB), a mapping relationship between an RO and an SSB, a repetition transmission configuration, or a reference signal configuration, where one PUSCH resource unit may represent one PO, or may represent a combination of one PO and one reference signal (a reference signal port and/or a reference signal sequence).

According to a second aspect, an uplink transmission resource determining method is provided. The method may be performed by a network device, and the method is specifically implemented by using the following steps: sending first system information block system information and second system information to a terminal, where the first system information includes a first physical uplink shared channel (PUSCH) resource configuration, and the second system information includes a second PUSCH resource configuration. In this way, a plurality of PUSCH resource configurations are dispersed in a plurality of pieces of system information, to help reduce load of the first system information. The plurality of PUSCH resource configurations are sent to the terminal, so that the terminal can flexibly select the PUSCH resource configuration in the first system information or the PUSCH resource configuration in the second system information based on a requirement of the terminal, to reduce the terminal to obtaining unnecessary information and reduce power consumption of the terminal.

In an embodiment, the first system information further includes association information of the second system information, and the association information is used to indicate a value range of a parameter of the second PUSCH resource configuration in the second system information. The terminal can more quickly determine, based on the association information, the second system information that should be selected for receiving when a preset condition is not met, to shorten a latency and further avoid a waste of power consumption caused by receiving unnecessary information.

In an embodiment, the first PUSCH resource configuration includes a first parameter, and the second PUSCH resource configuration includes a second parameter; and the first parameter and the second parameter have a same parameter type and different values; or the first parameter is of a first parameter type, and the second parameter is of a second parameter type.

In an embodiment, the first PUSCH resource configuration or the second PUSCH resource configuration includes at least one of the following types of parameters: a modulation and coding scheme (MCS), a transport block size (TBS), a PUSCH time domain resource configuration, a PUSCH frequency domain resource configuration, a power control configuration, a mapping configuration, a repetition transmission configuration, or a reference signal configuration. The mapping configuration is used to determine one or more of the following mapping relationships: a mapping relationship between a PRACH transmission occasion RO and a PUSCH transmission occasion PO, a mapping relationship between a preamble and a PO, a mapping relationship between a preamble and a PUSCH resource unit, a mapping relationship between a PUSCH resource unit and a synchronization signal block (SSB), and a mapping relationship between an RO and an SSB, where one PUSCH resource unit may represent one PO, a combination of one PO and one reference signal port, a combination of one PO and one reference signal sequence, or a combination of one PO, one reference signal port, and one reference signal sequence.

According to a third aspect, an apparatus is provided. The apparatus may be a terminal device, an apparatus in the terminal device, or an apparatus that can be used with the terminal device. In a design, the apparatus may include modules that are in a one-to-one correspondence with the methods/operations/steps/actions described in the first aspect. The modules may be implemented by using a hardware circuit, software, or a combination of a hardware circuit and software. In a design, the apparatus may include a processing module and a communication module. The processing module is configured to invoke the communication module to perform a receiving and/or sending function. The following provides an example.

The communication module is configured to receive first system information block system information sent by a network device, where the first system information includes a first physical uplink shared channel (PUSCH) resource configuration.

The processing module is configured to determine whether a preset condition is met.

The communication module is configured to receive second system information sent by the network device when the preset condition is not met, where the second system information includes a second PUSCH resource configuration.

The processing module is configured to determine, based on the second PUSCH resource configuration, a parameter used for uplink transmission.

In an embodiment, the processing module is further configured to determine, based on the first PUSCH resource configuration, a parameter used for uplink transmission when the preset condition is met.

In an embodiment, the processing module is specifically configured to determine, based on the first PUSCH resource configuration and the second PUSCH resource configuration, the parameter used for the uplink transmission.

In an embodiment, the first system information further includes association information of the second system information, and the association information is used to indicate a value range of a parameter of the second PUSCH resource configuration in the second system information.

In an embodiment, the preset condition includes: a parameter corresponding to the first PUSCH resource configuration meets a requirement for transmitting to-be-transmitted data.

In an embodiment, the preset condition includes one or more of the following: a modulation and coding scheme (MCS) required for the to-be-transmitted data is less than an MCS corresponding to the first PUSCH resource configuration; a size of the to-be-transmitted data is less than or equal to a TBS corresponding to the first PUSCH resource configuration; or a PUSCH time-frequency resource size required for transmitting the to-be-transmitted data is less than or equal to a PUSCH time-frequency resource size corresponding to the first PUSCH resource configuration.

In an embodiment, the processing module is further configured to: determine a value range of a value of a parameter required for transmitting to-be-transmitted data; and determine, based on the association information, the second system information associated with the value range.

In an embodiment, the first PUSCH resource configuration includes a first parameter, and the second PUSCH resource configuration includes a second parameter; and the first parameter and the second parameter have a same parameter type and different values; or the first parameter is of a first parameter type, and the second parameter is of a second parameter type.

In an embodiment, the first PUSCH resource configuration or the second PUSCH resource configuration includes at least one of the following types of parameters: a modulation and coding scheme (MCS), a transport block size (TBS), a PUSCH time domain resource configuration, a PUSCH frequency domain resource configuration, a power control configuration, a mapping configuration, a repetition transmission configuration, or a reference signal configuration. The mapping configuration is used to determine one or more of the following mapping relationships: a mapping relationship between a PRACH transmission occasion RO and a PUSCH transmission occasion PO, a mapping relationship between a preamble and a PO, a mapping relationship between a preamble and a PUSCH resource unit, a mapping relationship between a PUSCH resource unit and a synchronization signal block (SSB), and a mapping relationship between an RO and an SSB, where one PUSCH resource unit may represent one PO, a combination of one PO and one reference signal port, a combination of one PO and one reference signal sequence, or a combination of one PO, one reference signal port, and one reference signal sequence.

According to a fourth aspect, an apparatus is provided. The apparatus may be a network device, an apparatus in the network device, or an apparatus that can be used with the network device. In a design, the apparatus may include modules that are in a one-to-one correspondence with the methods/operations/steps/actions described in the third aspect. The modules may be implemented by using a hardware circuit, software, or a combination of a hardware circuit and software. In a design, the apparatus may include a processing module and a communication module. The processing module is configured to invoke the communication module to perform a receiving and/or sending function. The following provides an example.

The communication module is configured to send first system information block system information and second system information to a terminal, where the first system information includes a first physical uplink shared channel (PUSCH) resource configuration, and the second system information includes a second PUSCH resource configuration.

In an embodiment, the first system information further includes association information of the second system information, and the association information is used to indicate a value range of a parameter of the second PUSCH resource configuration in the second system information.

In an embodiment, the first PUSCH resource configuration includes a first parameter, and the second PUSCH resource configuration includes a second parameter; and the first parameter and the second parameter have a same parameter type and different values; or the first parameter is of a first parameter type, and the second parameter is of a second parameter type.

In an embodiment, the first PUSCH resource configuration or the second PUSCH resource configuration includes at least one of the following types of parameters: a modulation and coding scheme (MCS), a transport block size (TBS), a PUSCH time domain resource configuration, a PUSCH frequency domain resource configuration, a power control configuration, a mapping configuration, a repetition transmission configuration, or a reference signal configuration. The mapping configuration is used to determine one or more of the following mapping relationships: a mapping relationship between a PRACH transmission occasion RO and a PUSCH transmission occasion PO, a mapping relationship between a preamble and a PO, a mapping relationship between a preamble and a PUSCH resource unit, a mapping relationship between a PUSCH resource unit and a synchronization signal block (SSB), and a mapping relationship between an RO and an SSB, where one PUSCH resource unit may represent one PO, a combination of one PO and one reference signal port, a combination of one PO and one reference signal sequence, or a combination of one PO, one reference signal port, and one reference signal sequence.

According to a fifth aspect, an embodiment of this application provides an apparatus. The apparatus includes a communication interface and a processor, and the communication interface is used by the apparatus to communicate with another device, for example, to send and receive data or a signal. For example, the communication interface may be a transceiver, a circuit, a bus, a module, or another type of communication interface, and the another device may be a network device. The processor is configured to invoke a group of programs, instructions, or data to perform the method described in the first aspect. The apparatus may further include a memory, configured to store the programs, the instructions, or the data invoked by the processor. The memory is coupled to the processor, and when executing the instructions or the data stored in the memory, the processor can implement the method described in the first aspect.

According to a sixth aspect, an embodiment of this application provides an apparatus. The apparatus includes a communication interface and a processor, and the communication interface is used by the apparatus to communicate with another device, for example, to send and receive data or a signal. For example, the communication interface may be a transceiver, a circuit, a bus, a module, or another type of communication interface, and the another device may be a terminal device. The processor is configured to invoke a group of programs, instructions, or data to perform the method described in the second aspect. The apparatus may further include a memory, configured to store the programs, the instructions, or the data invoked by the processor. The memory is coupled to the processor, and when executing the instructions or the data stored in the memory, the processor can implement the method described in the second aspect.

According to a seventh aspect, an embodiment of this application further provides a computer-readable storage medium. The computer storage medium stores computer-readable instructions, and when the computer-readable instructions are run on a computer, the computer is enabled to perform the method in any one of the first aspect or the embodiments of the first aspect.

According to an eighth aspect, an embodiment of this application further provides a computer-readable storage medium, including instructions. When the instructions are run on a computer, the computer is enabled to perform the method in any one of the second aspect or the embodiments of the second aspect.

According to a ninth aspect, an embodiment of this application provides a chip system. The chip system includes a processor, and may further include a memory, configured to implement the method in any one of the first aspect or the embodiments of the first aspect. The chip system may include a chip, or may include a chip and another discrete component.

According to a tenth aspect, a computer program product is provided. The computer program product includes computer program code, and when the computer program code is run on a computer, the computer is enabled to perform the method in any one of the first aspect or the embodiments of the first aspect.

According to an eleventh aspect, a computer program product is provided. The computer program product includes computer program code, and when the computer program code is run on a computer, the computer is enabled to perform the method in any one of the second aspect or the embodiments of the second aspect.

According to a twelfth aspect, an embodiment of this application provides a chip system. The chip system includes a processor, and may further include a memory, configured to implement the method in any one of the second aspect or the embodiments of the second aspect. The chip system may include a chip, or may include a chip and another discrete component.

According to a thirteenth aspect, an embodiment of this application provides a system. The system includes the apparatus described in the third aspect and the apparatus described in the fourth aspect, or includes the apparatus described in the fifth aspect and the apparatus described in the sixth aspect.

DESCRIPTION OF EMBODIMENTS

Embodiments of this application provide an uplink transmission resource determining method and an apparatus, to implement a PUSCH resource configuration. The method and the apparatus are based on a same technical concept. The method and the apparatus have similar problem-resolving principles. Therefore, for implementation of the method and the apparatus, refer to each other. Repeated content is not described again. In descriptions of embodiments of this application, the term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects. In this application, "at least one" means one or more, and "a plurality of" means two or more. In addition, it should be understood that, in the descriptions of this application, the terms such as "first", "second", and "third" are merely used for differentiation and description, but cannot be understood as an indication or implication of relative importance or an indication or implication of an order.

A resource configuration method provided in embodiments of this application may be applied to a 5th generation (5G) communication system, for example, 5G new radio (NR), or applied to various future communication systems, for example, a 6th generation (6G) communication system.

The following describes in detail embodiments of this application with reference to the accompanying drawings.

Figure 1:
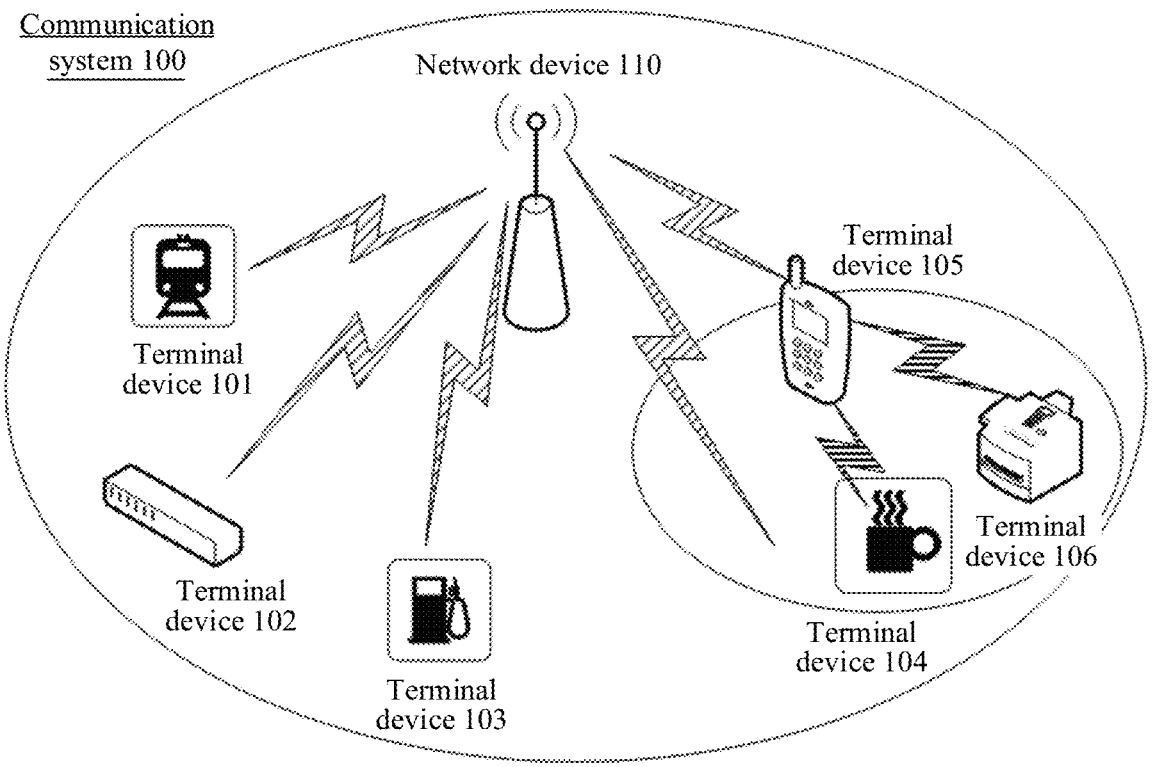
FIG. 1 is a schematic diagram of an architecture of a communication system according to an embodiment of this application.

An exemplary communication system architecture to which embodiments of this application are applicable is first described. As shown in FIG. 1, a communication system 100 may include a network device 110 and a terminal device 101 to a terminal device 106. It should be understood that the communication system 100 may include more or fewer network devices or terminal devices. The network device or the terminal device may be hardware, may be software obtained through functional division, or may be a combination of hardware and software. In addition, the terminal device 104 to the terminal device 106 may also form a communication system. For example, the terminal device 105 may send downlink data to the terminal device 104 or the terminal device 106. The network device or the terminal device may communicate with each other through another device or network element. The network device 110 may perform data transmission with the terminal device 101 to the terminal device 106. For example, the network device 110 may send downlink data to the terminal device 101 to the terminal device 106, or may receive uplink data sent by the terminal device 101 to the terminal device 106, and/or the terminal device 101 to the terminal device 106 may send uplink data to the network device 110, or may receive downlink data sent by the network device 110.

The network device 110 is a node in a radio access network (RAN), and may also be referred to as a base station, or may also be referred to as a RAN node (or device). The network device may also be referred to as a network side device. Currently, some examples of the network device 101 are: a gNB/an NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a base band unit (BBU), a wireless fidelity (Wi-Fi) access point (AP), a network side device in a 5G communication system or a possible future communication system, or the like. In embodiments of this application, an apparatus configured to implement a function of a network device may be a network device, or may be an apparatus, for example, a chip system, that can support the network device in implementing the function. The apparatus may be mounted in the network device. In technical solutions provided in embodiments of this application, an example in which an apparatus configured to implement a function of a network device is a network device or a base station is used to describe technical solutions provided in embodiments of this application.

The terminal device 101 to the terminal device 106 may also be referred to as terminals. The terminal may be user equipment (UE), a mobile station (MS), a mobile terminal (MT), or the like, and is a device that provides voice or data connectivity for a user, or may be an internet of things device. For example, the terminal device 101 to the terminal device 106 include a handheld device, a vehicle-mounted device, and the like that have a wireless connection function. Currently, the terminal device 101 to the terminal device 106 may be devices having a wireless transceiver function, and may be deployed on land, including an indoor or outdoor device, a handheld device, or a vehicle-mounted device, or may be deployed on a water surface (for example, on a ship), or may be deployed in air (for example, on an aircraft, a balloon, or a satellite). The terminal device may be user equipment (UE), and the UE includes a handheld device, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In embodiments of this application, an apparatus configured to implement a function of a terminal may be a terminal, or may be an apparatus, for example, a chip system, that can support the terminal in implementing the function. The apparatus may be mounted in the terminal. In embodiments of this application, the chip system may include a chip, or may include a chip and another discrete component. In technical solutions provided in embodiments of this application, an example in which an apparatus configured to implement a function of a terminal is a terminal or UE is used to describe technical solutions provided in embodiments of this application.

In embodiments of this application, the term "communication" may further be described as "data transmission", "information transmission", or "transmission", for example, codeword transmission. Technical solutions may be used to perform wireless communication between a scheduling entity and a subordinate entity. Persons skilled in the art may use technical solutions provided in embodiments of this application to perform wireless communication between another scheduling entity and the subordinate entity, for example, wireless communication between a macro base station and a micro base station, for example, wireless communication between a first terminal and a second terminal.

Figure 2:
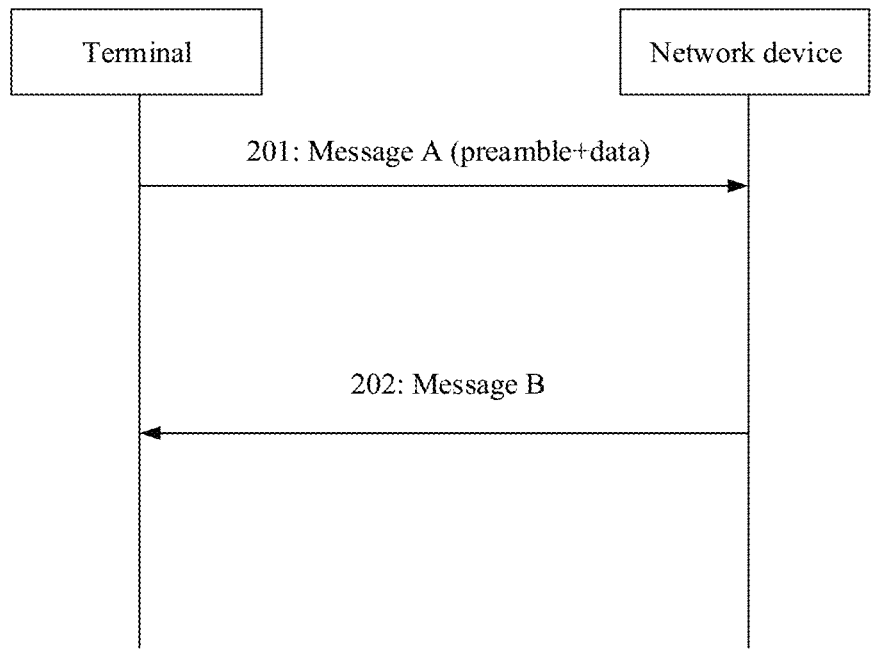
FIG. 2 is a schematic diagram of a two-step random access procedure according to an embodiment of this application.

A resource configuration method provided in embodiments of this application may be applied to a two-step random access technology. When new uplink data arrives but no uplink synchronization is performed, the terminal needs to perform random access. As shown in FIG. 2, a two-step random access procedure is described as follows:

S201: A terminal sends a message A to a network device, and the network device receives the message A from the terminal.

The message A may include two parts of content. One part of content is a random access preamble, and the other part of content is uplink data. The random access preamble may be referred to as a preamble for short. During actual application, the preamble may alternatively be replaced with another type of codeword provided that the another type of codeword can be used to distinguish between uplink signals of different UEs, different channels, or different connections. The preamble may be carried on a PRACH for transmission, and the uplink data may be carried on a PUSCH. From one perspective, the message A is transmitted on two resources, including transmission of the preamble on a PRACH resource and transmission of the uplink data on a PUSCH resource. The message A includes the uplink data, so that some data that has a high latency requirement may be transmitted by using the message A.

S202: The network device sends a message B to the terminal, and the terminal receives the message B sent by the network device.

This embodiment of this application describes a PUSCH resource configuration. The PUSCH resource may be a resource used to transmit a data part in the message A, or may be a resource used to transmit grant-free uplink data of the terminal. In other words, the message A may include the preamble and the uplink data, or may include the uplink data but exclude the preamble. The message A may be sent in a non-connected state, for example, an idle state or an inactive state, or may be sent in a connected state. The following describes content of the PUSCH resource configuration. The PUSCH resource may be referred to as a PUSCH time domain resource in a time domain dimension, and the PUSCH resource may be referred to as a PUSCH frequency domain resource in a frequency domain dimension. The PUSCH resource may be represented by using a PUSCH transmission occasion (PUSCH occasion, PO). One PO represents a resource used to transmit a PUSCH, includes one or more subcarriers in frequency domain, and includes one or more time domain symbols in time domain.

The PUSCH resource configuration may include configuration information of one or more of the following parameters:

(1) Modulation and coding scheme (MCS). The MCS is usually used to describe a configuration of modulation and a code rate, and an MCS index value may be used to correspond to a physical transmission rate of a group of parameters.

(2) Transport block size (TBS). The TBS is usually used to describe a configuration of an amount of data that can be transmitted by using a PUSCH resource.

(3) PUSCH time domain resource configuration. The PUSCH time domain resource configuration is used to indicate a configuration of a PUSCH resource in time domain. For example, the PUSCH time domain resource configuration may include one or more of a time domain start position of the PUSCH resource, a time domain end position of the PUSCH resource, or a time domain length of the PUSCH resource. When the PUSCH resource is represented by a PO, the PUSCH time domain resource configuration may be described by using some resource configurations related to the PO. For example, the PUSCH time domain resource configuration may be one or more of a PO time domain start position, a PO time domain length, a quantity of POs on which time division multiplexing is performed, or a PO time domain guard period.

(4) PUSCH frequency domain resource configuration. The PUSCH frequency domain resource configuration is used to indicate a configuration of a PUSCH resource in frequency domain. For example, the PUSCH frequency domain resource configuration may include one or more of a frequency domain start position of the PUSCH resource, a frequency domain end position of the PUSCH resource, or a frequency domain length of the PUSCH resource. When the PUSCH resource is represented by a PO, the PUSCH frequency domain resource configuration may be described by using some resource configurations related to the PO. For example, the PUSCH frequency domain resource configuration may be one or more of a PO frequency domain start position configuration, a PO frequency domain length, a quantity of POs on which frequency division multiplexing is performed, or a PO frequency domain guard period.

(5) Power control configuration. This configuration is used to indicate some parameters related to power control.

(6) Mapping configuration.

In a two-step random access procedure, a preamble and uplink data (or data for short) are sent in a same message (message A), but a PRACH resource used to transmit the preamble is different from a PUSCH resource used to transmit the uplink data. Therefore, a mapping relationship between a PRACH resource and a PUSCH resource needs to be established. In this way, when receiving a preamble, a network device may determine a PUSCH resource on which a data part corresponding to the preamble is located. Alternatively, when receiving a plurality of messages A, a network device may determine a preamble and data that are sent by a same terminal.

The mapping configuration may be used to determine one or more of the following mapping relationships: a mapping relationship between a PRACH transmission occasion (PRACH occasion, RO) and a PO, where one RO represents a time-frequency resource used to transmit a preamble, includes one or more subcarriers in frequency domain, and includes one or more time domain symbols in time domain; a mapping relationship between a preamble and a PO; a mapping relationship between a preamble and a PUSCH resource unit, where one PUSCH resource unit may represent one PO, or may represent a combination of one PO and one reference signal (a reference signal port and/or a reference signal sequence); a mapping relationship between a PUSCH resource unit and a synchronization signal block (SS/PBCH block, SSB); and a mapping relationship between an RO and an SSB. In an embodiment, the mapping configuration may include one or more parameters used to determine the mapping relationship described above.

(7) Repetition transmission configuration.

The repetition transmission configuration may be used to determine a quantity n of repetition times of a PUSCH, that is, a terminal may repeatedly transmit same data on n POs. In an embodiment, the parameter n may also be used to determine a PUSCH time-frequency resource for repetition transmission.

(8) Reference signal configuration, for example, a configuration of a demodulation reference signal (DMRS), a sounding reference signal (SRS), or another type of reference signal.

It may be understood that the PUSCH resource configuration may further include more configurations.

In an exemplary implementation, the PUSCH resource configuration is carried by using system information, for example, carried by using a system information block (SIB) 1. The network device includes the PUSCH resource configuration in the system information, so that PUSCH resource configurations obtained by all terminals that monitor the system information are the same. However, a same PUSCH resource configuration is not necessarily applicable to all terminals. For example, different terminals have different data packet sizes or channel conditions, and the different terminals have different requirements for PUSCH resources. For another example, a same terminal also has different data packet sizes or channel conditions at different moments. Therefore, the same terminal has different requirements for PUSCH resources at the different moments. To support the terminal in flexibly selecting a PUSCH resource configuration, the network device may broadcast a plurality of PUSCH resource configurations in the system information. In the plurality of PUSCH resource configurations, one or more parameters in different PUSCH resource configurations are different. For example, MCSs in different PUSCH resource configurations are different. For another example, TBSs in different PUSCH resource configurations are different. In this way, the terminal may select, from the plurality of PUSCH resource configurations, one PUSCH configuration applicable to the terminal. However, a method for configuring a plurality of PUSCH resource configurations causes some problems: Because the SIB 1 carries the plurality of PUSCH resource configurations, overheads of the SIB 1 are high. In addition, for the terminal, the terminal needs only one PUSCH resource, but needs to receive a plurality of PUSCH resources. Consequently, the terminal receives many useless parameters, resulting in an increase in power consumption.

The following specifically describes a resource configuration method provided in embodiments of this application.

PUSCH resource configurations expected by different terminals may be different, or PUSCH resource configurations expected by a same terminal at different moments may be different. This application provides a plurality of PUSCH resource configurations for the terminal, to meet PUSCH resource configuration requirements of the terminal in different cases.

In descriptions of embodiments of this application, one PUSCH resource configuration may also be referred to as one complete PUSCH resource configuration. One PUSCH resource configuration refers to all parameters that may be used for uplink transmission of the terminal. In an exemplary implementation, some parameters used for the uplink transmission of the terminal may be defined by default or predefined. In this way, one PUSCH resource configuration may refer to, in addition to some default or predefined parameters, another parameter that may be used for the uplink transmission of the terminal. In other words, a parameter in one PUSCH resource configuration and a default/predefined parameter together form all parameters used for the uplink transmission of the terminal.

One PUSCH resource configuration may include a configuration of one or more of the foregoing parameters (1) to (8), or may include configurations of more or fewer parameters. In the following descriptions of exemplary implementations of embodiments of this application, different PUSCH resource configurations may include a same parameter or different parameters. In the different PUSCH resource configurations, values of a same parameter may be the same or different.

Figure 3:
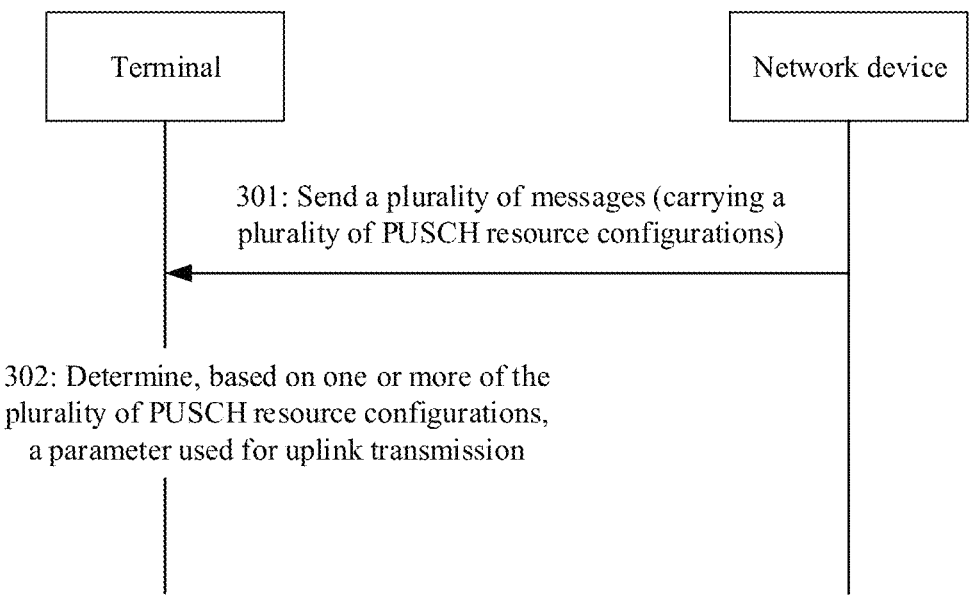
FIG. 3 is a schematic flowchart of a resource configuration method according to an embodiment of this application.

As shown in FIG. 3, a specific procedure of a resource configuration method provided in an embodiment of this application is described below.

S301: A network device sends a plurality of messages to a terminal.

The plurality of messages carry a plurality of PUSCH resource configurations. One message may carry one PUSCH resource configuration, or one message may carry two or more PUSCH resource configurations. For example, the network device provides five PUSCH resource configurations, a first message carries two PUSCH resource configurations, a second message carries one PUSCH resource configuration, and each of a third message and a fourth message carries one PUSCH resource configuration. In this way, the plurality of provided PUSCH resource configurations are dispersed in the plurality of messages, so that excessive overheads of one of the messages can be reduced. For example, the first message is a SIB 1 message. In this case, excessive overheads of the SIB 1 message are reduced.

Alternatively, each of the plurality of messages carries one or more types of parameters. The first message carries at least one parameter of a first type, and the second message carries at least one parameter of a second type. The first type is different from the second type. The parameter of the first type carried in the first message may have one or more values. Similarly, the parameter of the second type carried in the second message may also have one or more values.

S302: The terminal determines, based on one or more of the plurality of PUSCH resource configurations, a parameter used for uplink transmission.

The terminal may select, based on an uplink transmission requirement, the parameter used for the uplink transmission from the plurality of PUSCH resource configurations. In this way, the terminal may send an uplink signal to the network device based on the selected parameter.

If each of the plurality of messages carries one or more PUSCH resource configurations, the terminal selects one of the plurality of PUSCH resource configurations, and determines, based on the selected PUSCH resource configuration, the parameter used for the uplink transmission.

If each of the plurality of messages carries one or more types of parameters, the terminal may select a parameter in one message, and determine the parameter used for the uplink transmission based on the selected parameter and a default/predefined parameter. Alternatively, the terminal may select, from the plurality of messages, a set of parameters used for the uplink transmission. Alternatively, the terminal selects parameters in the plurality of messages, and determines the parameter used for the uplink transmission based on the selected parameters and a default/predefined parameter.

In this embodiment of this application, a PUSCH time-frequency resource may be independently configured, or a relative position of a PUSCH time-frequency resource may be configured based on a physical random access channel (PRACH) time-frequency resource.

This embodiment of this application may be applied to a PUSCH resource configuration of a data part in a message A in a two-step random access procedure. When the method is applied to the two-step random access procedure, the terminal may be in an idle state or an inactive state. The terminal in the idle state or in the inactive state is not synchronized with the network device, and the terminal needs to monitor system information. In this case, the plurality of messages may refer to system information. For example, the plurality of messages may include a SIB 1 message, a SIB x message, or on demand system information, where x is a positive integer greater than 1.

In addition, this embodiment of this application may also be applied to a terminal in a connected (connect) state but in an out-of-synchronization state. The terminal in the connected state but in the out-of-synchronization state needs to perform synchronization again through random access, for example, perform synchronization again through two-step random access. The terminal in the out-of-synchronization state also needs to monitor the system information or another message used to configure a random access resource. The plurality of pieces of information may include system information, and may also include a radio resource control (RRC) message or downlink control information (DCI).

The following describes how the terminal determines the parameter used for the uplink transmission.

Figure 4:
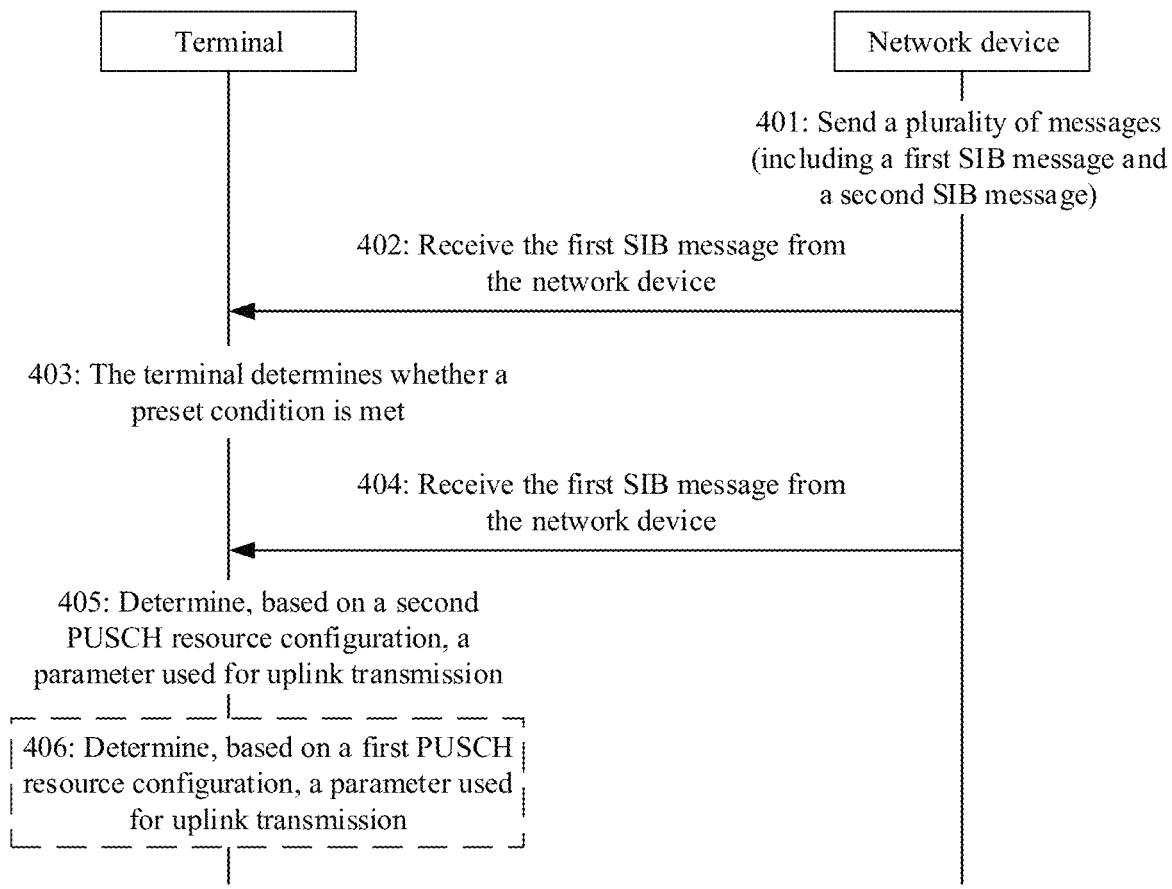
FIG. 4 is a schematic flowchart 1 of an uplink transmission resource determining method according to an embodiment of this application.

In an exemplary implementation, as shown in FIG. 4, a specific procedure of an uplink transmission resource determining method provided in an embodiment of this application is described below.

S401: A network device sends a plurality of messages to a terminal, where the plurality of messages include first system information and second system information.

S402: The terminal receives the first system information sent by the network device.

The first system information includes a first PUSCH resource configuration. The second system information includes a second PUSCH resource configuration.

The first PUSCH resource configuration may be one or more PUSCH resource configurations, and the second PUSCH resource configuration may be one or more PUSCH resource configurations. For example, a parameter in the first PUSCH resource configuration is referred to as a first parameter, and a parameter in the second PUSCH resource configuration is referred to as a second parameter. In this case, one or more parameter types of the first parameter and the second parameter are the same, but values may be different. Certainly, when the first PUSCH resource configuration includes a plurality of types of first parameters, and the second PUSCH resource configuration includes a plurality of types of second parameters, values of some types of first parameters and second parameters may also be the same.

Alternatively, in a case, the first PUSCH resource configuration may include one or more types of parameters, and the second PUSCH resource configuration includes one or more types of parameters. For example, a parameter in the first PUSCH resource configuration is referred to as a first parameter, and a parameter in the second PUSCH resource configuration is referred to as a second parameter. In this case, the first parameter is of a first parameter type, and the second parameter is of a second parameter type. The first parameter type is different from the second parameter type. Certainly, the first PUSCH resource configuration may include a plurality of first parameter types, the second PUSCH resource configuration may include a plurality of second parameter types, and some first parameter types in the first PUSCH resource configuration may also be the same as some second parameter types in the second PUSCH resource configuration. This case is met provided that some first parameter types are different from some second parameter types.

Alternatively, in another case, the second PUSCH resource configuration may not be one complete PUSCH resource configuration, but includes a part of parameters in one PUSCH resource configuration. A parameter missing in the second PUSCH resource configuration is the same as a parameter of a corresponding type in the first PUSCH resource configuration by default. It may be understood that a part of parameters in one complete PUSCH resource configuration are common parameters, and the common parameters need to be configured only in the first system information, and no configuration is required in the second system information. After the terminal obtains a PUSCH resource configuration in the second system information, one complete PUSCH resource configuration is formed together with the common parameters in the first system information. The first PUSCH resource configuration and a part of default parameters (for example, defined in a protocol) form at least one PUSCH resource configuration. In other words, the terminal may need to receive only the first PUSCH resource configuration, and then can obtain at least one PUSCH resource configuration based on the part of default parameters. Alternatively, the common parameter may be a parameter predefined in a protocol by default. No configuration is required in the first system information and another message.

S403: The terminal determines whether a preset condition is met, and performs S404 when the preset condition is not met; or performs S406 when the preset condition is not met.

S404: Receive the second system information sent by the network device.

S405: Determine, based on the second PUSCH resource configuration, a parameter used for uplink transmission.

If the second PUSCH resource configuration includes one or more PUSCH resource configurations, the terminal determines, based on the second PUSCH resource configuration, the parameter used for the uplink transmission.

If the second PUSCH resource configuration includes one or more types of second parameters, and the second parameter included in the second PUSCH resource configuration may not be one complete set of parameters used for the uplink transmission, the terminal determines, based on the first PUSCH resource configuration and the second PUSCH resource configuration, the parameter used for the uplink transmission. For example, the terminal determines the first parameter in the first PUSCH resource configuration and the second parameter in the second PUSCH resource configuration as parameters used for the uplink transmission. Alternatively, the terminal may determine, based on the second parameter in the second PUSCH resource configuration and a default/predefined parameter, parameters used for the uplink transmission.

S406: Determine, based on the first PUSCH resource configuration, a parameter used for uplink transmission.

After determining the parameter used for the uplink transmission, the terminal performs uplink transmission based on the parameter, for example, performs two-step random access.

In this embodiment of this application, the plurality of PUSCH resource configurations are carried in the plurality of messages, so that overheads of the first system information can be reduced. For example, the first system information is a SIB 1, and overheads of the SIB 1 can be reduced. The terminal first receives the first system information. When the first PUSCH resource configuration in the first system information may meet an uplink transmission requirement of the terminal, the terminal determines, based on the first PUSCH resource configuration, the parameter used for the uplink transmission, or may determine, based on the first PUSCH resource configuration in the second PUSCH resource configuration and the default/predefined parameter, the parameter used for the uplink transmission. The terminal does not need to receive another message used to provide the second PUSCH resource configuration, to avoid a power consumption increase caused by the terminal receiving a useless parameter, that is, help reduce power consumption of the terminal.

The preset condition is used to determine whether the first PUSCH resource configuration is sufficient to meet the uplink transmission requirement of the terminal, and any condition may be set based on a requirement of actual application. For example, the preset condition may include that a parameter corresponding to the first PUSCH resource configuration meets a requirement for transmitting to-be-transmitted data. The parameter corresponding to the first PUSCH resource configuration may be understood as a parameter included in the first PUSCH resource configuration, or may be understood as a default/predefined parameter used when the first PUSCH resource configuration and the default/predefined parameter together form a PUSCH resource configuration.

When the parameter corresponding to the first PUSCH resource configuration meets the requirement for transmitting the to-be-transmitted data, the parameter used for the uplink transmission is determined based on the first PUSCH resource configuration, and the parameter in the first PUSCH resource configuration may be used as the parameter used for the uplink transmission. When the parameter corresponding to the first PUSCH resource configuration does not meet the requirement for transmitting the to-be-transmitted data, the terminal receives the second system information sent by the network device, for example, another SIB message, obtains the second PUSCH resource configuration from the second system information, and determines, based on the second PUSCH resource configuration, the parameter used for the uplink transmission, or determines, based on the second PUSCH resource configuration and the first PUSCH resource configuration, the parameter used for the uplink transmission.

The requirement for transmitting the to-be-transmitted data may be considered from a plurality of aspects. The following provides an example for description.

In an example, the parameter corresponding to the first PUSCH resource configuration may be used to determine a modulation and coding scheme (MCS) corresponding to the first PUSCH resource configuration. The preset condition may be that an MCS required for the to-be-transmitted data is less than the MCS corresponding to the first PUSCH resource configuration.

In an example, the parameter corresponding to the first PUSCH resource configuration may be used to determine a transport block size (TBS) corresponding to the first PUSCH resource configuration. The preset condition may be that a size of the to-be-transmitted data is less than or equal to the TBS corresponding to the first PUSCH resource configuration.

In an example, the parameter corresponding to the first PUSCH resource configuration may be used to determine a PUSCH time-frequency resource size corresponding to the first PUSCH resource configuration. The preset condition may be that a PUSCH time-frequency resource size required for transmitting the to-be-transmitted data is less than or equal to the PUSCH time-frequency resource size corresponding to the first PUSCH resource configuration.

It may be understood that the preset condition may alternatively be determined by the terminal, and does not need to be predefined, or configured by the network device. In other words, preset conditions used by all terminals to perform determining may be the same or may be different.

Certainly, the parameter corresponding to the first PUSCH resource configuration may alternatively be another parameter in the first PUSCH resource configuration, for example, may alternatively be the parameters enumerated in the foregoing (1) to (8).

During actual application, the plurality of messages may include more than one piece of second system information, and may further include other signaling, for example, an RRC message.

When the preset condition is not met, the terminal receives the second system information or receives the RRC message, to obtain a PUSCH resource configuration used to configure an uplink parameter.

Further, the parameter required by the terminal may be located in a piece of second system information or an RRC message. To enable the terminal to determine the second system information in which the required parameter is located, the network device may include association information of the second system information in the first system information. The association information is used to indicate a value range of a parameter of the second PUSCH resource configuration in the second system information. When receiving the first system information, the terminal determines one or more pieces of second system information from the association information carried in the first system information if the preset condition is not met. The terminal needs to receive only the second system information determined based on the association information. In this way, unnecessary power consumption caused by the terminal receiving more messages can be avoided. Certainly, the first system information may also carry association information of an RRC message. If the terminal determines, based on association information, that a PUSCH resource configuration carried in an RRC message can meet the uplink transmission requirement, the terminal receives the RRC message, and obtains the PUSCH resource configuration from the RRC message.

Further, the first system information may further include a parameter used by the terminal to obtain the second system information or the RRC message. For example, the first system information may include a resource configuration used to transmit the second system information or the RRC message, or the first system information may include a resource configuration or search space configuration information of control information corresponding to the second system information or the RRC message.

After obtaining the association information, the terminal determines a value range of a value of a parameter required for transmitting the to-be-transmitted data, and determines, based on the association information, the second system information associated with the value range.

For example, if the parameter in the second PUSCH resource configuration is an MCS, the association information may indicate value ranges of MCSs respectively corresponding to a plurality of second SIB messages. The terminal determines an MCS value range of an MCS required for transmitting the to-be-transmitted data, and determines, based on the association information, second system information, in the plurality of pieces of second system information, associated with the MCS value range.

The following further describes in detail the uplink transmission resource determining method provided in this embodiment of this application with reference to a specific application scenario. It is assumed that the first system information is a SIB 1 and the second system information is another SIB message such as a SIB x, where x is a positive integer greater than 1. An example in which an uplink transmission resource is a PUSCH resource in a msg A is used. The terminal sends the msg Ain two-step random access by using a determined PUSCH resource configuration. Certainly, the descriptions of the second system information may alternatively be replaced with those of the RRC message. In this embodiment of this application, a SIB message is used as an example for description. In the following descriptions, "another message" is used to represent the second system information or the RRC message.

(1) First, a first case is described. The first PUSCH resource configuration may be one or more PUSCH resource configurations, and the second PUSCH resource configuration may be one or more PUSCH resource configurations. In other words, a type of parameter in a PUSCH resource configuration is configured in both a SIB 1 message and another SIB message.

The network device sends a plurality of SIB messages to the terminal, where the SIB 1 message carries one or more PUSCH resource configurations, a SIB x message carries one or more PUSCH resource configurations, and another SIB message may further carry one or more PUSCH resource configurations. Different SIB messages carry different PUSCH resource configurations.

The terminal first receives the SIB 1 message, and obtains the PUSCH resource configuration from the SIB 1 message. The terminal may determine, based on a requirement of the terminal, whether to select the PUSCH resource configuration in the SIB 1 message. For example, the requirement of the terminal may be a size of to-be-transmitted data, or a channel condition of the terminal, for example, a reference signal received power (RSRP). The terminal may select, based on a determining result, the PUSCH resource configuration in the SIB 1 message to perform two-step random access. Alternatively, the terminal may continue to receive another message such as the SIB x based on the requirement of the terminal, and select a PUSCH resource configuration in the another message to perform two-step random access.

In addition, the SIB 1 message may further include association information required for obtaining one or more other messages. For example, the SIB 1 message includes association information of the PUSCH resource configuration carried in the another message. The association information may be a part of parameters or value ranges of a part of parameters in a PUSCH resource configuration carried in the another message. The terminal may determine, based on the association information carried in the SIB 1, to use a specific PUSCH resource configuration, and further determine to receive a specific SIB message, to obtain the PUSCH resource configuration. The association information may be one or more of an MCS, a TBS, a PUSCH transmission occasion resource size, or a repetition transmission configuration of the another message. The association information may alternatively be an association relationship between another message and a value range of one or more of the following parameters: an MCS, a TBS, a PUSCH transmission occasion resource size, or a repetition transmission configuration. For example, a SIB 2 is associated with a first MCS value range, and a SIB 3 is associated with a second MCS value range. The terminal may first determine a value range of a parameter required for the to-be-transmitted data, and then determine, based on the association information, a specific SIB message corresponding to the range. In an exemplary implementation, alternatively, the association information may not be carried in the SIB 1 message, but is predefined in a protocol. For example, the association information predefined in the protocol is one or more of an MCS, a TBS, a size of a to-be-sent data packet, a path loss, a PUSCH transmission occasion resource size, or a repetition transmission configuration of the another message. Alternatively, a value range of one or more of the following parameters: an MCS, a TBS, a size of a to-be-sent data packet, a path loss, a PUSCH transmission occasion resource size, or a repetition transmission configuration of the another message may be predefined in the protocol.

Optionally, the PUSCH resource configuration carried in the another message may not be one complete PUSCH resource configuration, but includes a part of parameters in one PUSCH resource configuration. A parameter of the PUSCH resource configuration missing in the another message is the same as a parameter of a same type in the SIB 1 message by default. It may be understood that a part of parameters in one complete PUSCH resource configuration are common parameters, and the common parameters need to be configured only in the SIB 1 message, and no configuration is required in the another message. After the terminal obtains the PUSCH resource configuration in the another message, one complete PUSCH resource configuration is formed together with the common parameters in the SIB 1. Alternatively, the common parameter may be a parameter predefined in a protocol by default. No configuration is required in the SIB 1 message and the another message.

It should be understood that one complete PUSCH resource configuration refers to all parameters required for determining PUSCH transmission in the msg A. The common parameters may be defined by default or predefined. The PUSCH resource configuration obtained by the terminal from the SIB 1 message or the another message may not include these common parameters. The terminal may determine, based on both a parameter obtained from the SIB message or the another message and the common parameters, one resource configuration that may be used for the PUSCH transmission in the msg A.

In an example, the terminal receives the SIB 1 message, and obtains a PUSCH resource configuration from the SIB 1, and the PUSCH resource configuration includes a msg A PUSCH resource configuration parameter used to establish an RRC connected state. A TBS configured by the PUSCH resource configuration is small, and is used to transmit data with a small data amount (for example, 56 bits or 72 bits). However, a data amount of the to-be-transmitted data (for example, user plane data) is large, for example, greater than 56 bits or greater than 72 bits, the TBS configured by the PUSCH resource configuration cannot meet a requirement. In an embodiment, in the PUSCH resource configuration, an MCS is a lower order, for example, binary phase shift keying (BPSK) or quadrature phase shift keying (QPSK). It can also be ensured that a data packet of a terminal with a poor channel condition is correctly transmitted. The terminal may choose to use the PUSCH configuration to perform random access, to establish the RRC connected state. Alternatively, the terminal may select a PUSCH resource configuration in another SIB message based on a requirement. For example, if the terminal needs to transmit a large user plane data packet, the terminal may obtain, from another SIB message, one PUSCH configuration with a large TBS, perform random access by using a PUSCH resource indicated by the PUSCH configuration, and perform data transmission.

In an example, the terminal obtains association information of the another message from the SIB 1 message, and the association information is used to indicate an association relationship between the another message and a value range of a parameter. The terminal obtains an MCS value range of the PUSCH resource configuration in the another message from the SIB 1 message, and obtains a value range of a PUSCH transmission occasion resource size of the PUSCH resource configuration in the another message. The terminal may determine a used MCS and a used PUSCH transmission occasion resource size based on a size of the to-be-transmitted data of the terminal and a path loss between the terminal and the network device. When a plurality of other different PUSCH resource configurations are carried in a plurality of messages, the terminal may determine an MCS value range of the determined MCS and a value range of a PUSCH transmission occasion resource size, determine, based on the association information obtained from the SIB 1 message, a specific message in which a set of PUSCH resource configuration parameters corresponding to the value range is located, and obtain configuration information required for the message, for example, search space of a PDCCH associated with the message.

Optionally, it may be stipulated in a protocol that a PUSCH resource configuration of some parameters within a specific value range may be carried in a specific message. For example, it is predefined in the protocol that a PUSCH resource configuration of an MCS within a specific value range is located in a specific message (for example, a SIB 2 message), or a PUSCH resource configuration of a size of a to-be-transmitted data packet within a specific value range is located in a specific message (for example, a SIB 3 message).

(2) In a second case, the first PUSCH resource configuration may alternatively include one or more types of first parameters, and the second PUSCH resource configuration includes one or more types of second parameters. A parameter type included in the first PUSCH resource configuration is not exactly the same as or different from a parameter type included in the second PUSCH resource configuration. In other words, a type of parameter in a PUSCH resource configuration may be configured only in the SIB 1 message, and is not configured in another SIB message; or may be configured only in another SIB message, and is not configured in the SIB 1 message.

The network device sends a plurality of SIB messages to the terminal, a SIB 1 message carries one or more types of first parameters, and another message carries one or more types of second parameters.

The terminal first receives the SIB 1 message, and obtains one or more parameters of a first parameter type in the PUSCH resource configuration from the SIB 1 message. The parameters obtained by the terminal from the SIB 1 message may not be sufficient to determine all parameters for completing uplink transmission. The terminal may continue to receive the another message, and obtain one or more parameters of a second parameter type in the PUSCH resource configuration from the another message. The terminal may perform two-step random access by using the parameters obtained from the SIB 1 message and the parameters obtained from another message. The terminal may alternatively perform two-step random access by using the parameters obtained from the SIB 1 message and a parameter in a default/protocol-predefined PUSCH resource configuration.

The parameters carried in the SIB 1 message may be common parameters. The common parameters may be used for a PUSCH resource configuration of each other message, and one complete PUSCH resource configuration is formed by using the common parameters and the parameters in the another message. The common parameters may alternatively be defined by default or predefined and may be used for the SIB 1 message and each other message. Some types of parameters in a PUSCH resource configuration may be fixedly configured in one or more other messages. The terminal may select a message from a plurality of other messages based on a requirement of the terminal, to obtain a parameter of the type. For example, the requirement of the terminal may be a size of to-be-transmitted data, or a channel condition of the terminal, for example, an RSRP.

The terminal may determine, based on the requirement of the terminal, whether the parameters carried in the SIB 1 may be used for uplink transmission. If the parameters carried in the SIB 1 may be used for uplink transmission, the terminal selects the parameters carried in the SIB 1 to perform random access. For example, the terminal may perform two-step random access by using the parameters carried in the SIB 1 and some parameters in a default/protocol-predefined PUSCH resource configuration. Alternatively, the terminal may select a message from a plurality of other messages to obtain a parameter based on a requirement of the terminal, and parameters required for uplink transmission may be formed together with the parameters in the SIB 1 message.

In addition, the SIB 1 message may further include association information required for obtaining one or more other messages. The one or more parameters of the first parameter type are carried in the SIB 1 message. The association information carried in the SIB 1 message is a parameter or a value range of a parameter of another parameter type carried in the another message. The terminal may determine, based on the association information carried in the SIB 1, to use a specific PUSCH resource configuration, and further determine to receive a specific SIB message, to obtain the PUSCH resource configuration. The association information may be one or more of an MCS, a TBS, a PUSCH transmission occasion resource size, or a repetition transmission configuration of the another message. The association information may alternatively be an association relationship between another message and a value range of one or more of the following parameters: an MCS, a TBS, a PUSCH transmission occasion resource size, or a repetition transmission configuration. For example, a SIB 2 is associated with a first MCS value range, and a SIB 3 is associated with a second MCS value range. The terminal may first determine a value range of a parameter required for the to-be-transmitted data, and then determine, based on the association information, a specific SIB message corresponding to the range. In an exemplary implementation, alternatively, the association information may not be carried in the SIB 1 message, but is predefined in a protocol. For example, the association information predefined in the protocol is one or more of an MCS, a TBS, a size of a to-be-sent data packet, a path loss, a PUSCH transmission occasion resource size, or a repetition transmission configuration of the another message. Alternatively, a value range of one or more of the following parameters: an MCS, a TBS, a size of a to-be-sent data packet, a path loss, a PUSCH transmission occasion resource size, or a repetition transmission configuration of the another message may be predefined in the protocol.

The SIB 1 message may carry common parameters, and the another message carries a parameter of another type. The terminal may jointly obtain a PUSCH resource configuration from the SIB 1 message and the another message, and perform two-step random access by using a PUSCH resource determined by the PUSCH resource configuration. Alternatively, the terminal may obtain the common parameters in the SIB 1 message, and use the common parameters and some predefined parameters to form a PUSCH resource configuration, and perform two-step random access by using a PUSCH resource determined by the PUSCH resource configuration.

For example, the SIB 1 message carries a mapping configuration between an SSB and a PRACH transmission occasion, and/or a mapping configuration between a PUSCH transmission occasion and an SSB. The another message carries a mapping configuration between a PRACH transmission occasion and a PUSCH transmission occasion, and/or a mapping configuration between a preamble and a PUSCH resource unit. The terminal may obtain a set of complete mapping configuration parameters from the SIB 1 message and the another message; or may obtain only an SSB and PRACH transmission occasion configuration parameter from the SIB 1 message, and determine a set of complete mapping configuration parameters by using the parameter and a predefined preamble and PUSCH resource unit mapping configuration parameter.

For another example, the SIB 1 message carries a part of parameters of a DMRS resource configuration, and another parameter is carried in the another message. For example, the SIB 1 message carries a DMRS type configuration parameter, a DMRS time domain length and position parameter, and the another message carries a DMRS port indication parameter and a DMRS sequence configuration parameter. The terminal may obtain a set of complete DMRS configuration parameters from the SIB 1 message and the another message; or may obtain only the DMRS type configuration parameter and the DMRS time domain length and position parameter from the SIB 1 message, and determine a set of complete DMRS configuration parameters by using these parameters, a predefined DMRS port indication parameter, and a predefined DMRS sequence configuration parameter.

For another example, the SIB 1 message carries a PUSCH time-frequency resource configuration parameter, and a DMRS configuration parameter is carried in one or more other messages.

For another example, the SIB 1 message carries a power control parameter in a first message, and a PUSCH time-frequency resource configuration parameter is carried in one or more other messages.

Based on the foregoing descriptions, if PUSCH resource configurations in the plurality of messages are entirely independent, and there is no common parameter, each PUSCH resource may be independently determined based on a PUSCH resource configuration in each message. If PUSCH resource configurations in the plurality of messages have a common parameter, where the common parameter may be a default/predefined parameter and may be predefined in a protocol, the parameter does not need to be configured in both the first message and a second message; or the common parameter may be carried only in the first message, and the parameter does not need to be configured in a second message. The terminal may jointly determine one complete PUSCH resource configuration based on the common parameter carried in the first message and a parameter carried in the second message.

The following describes a configuration scenario of a common parameter in a plurality of messages by using several examples.

Scenario 1: A common parameter is a PUSCH time-frequency resource configuration parameter. The PUSCH time-frequency resource configuration parameter is used to determine a PUSCH transmission unit and a PUSCH time-frequency resource size.

The PUSCH time-frequency resource configuration parameter includes a PUSCH time domain resource configuration parameter and a PUSCH frequency domain resource configuration parameter. For PUSCH resource configurations in all messages, parameters of another type other than the common parameter are different. For example, values of one or more of the following parameters: an MCS, a TBS, a repetition transmission configuration, or a DMRS configuration in all messages are different. Optionally, a plurality of PUSCH resource configurations are distinguished by using different DMRS configurations, and the DMRS configuration includes a DMRS port and/or a DMRS sequence. The DMRS configuration is associated with the MCS, the TBS, or a quantity of times of repetition transmission.

Scenario 2: A common parameter is a PUSCH time-frequency resource configuration parameter, and the PUSCH time-frequency resource configuration parameter is used to determine a PUSCH transmission unit.

The PUSCH time-frequency resource configuration parameter includes a PUSCH time domain resource configuration parameter and a PUSCH frequency domain resource configuration parameter. The PUSCH transmission unit is also referred to as a PUSCH time-frequency resource range or a time-frequency resource unit. One PUSCH transmission occasion includes one or more PUSCH transmission units. One PUSCH transmission unit represents a time-frequency resource, for example, includes one or more subcarriers in frequency domain, and includes one or more time domain symbols in time domain. The plurality of subcarriers included in the PUSCH transmission unit may be consecutive or inconsecutive in frequency domain.

One or more of the following configurations: PUSCH transmission occasion sizes, MCSs, TBSs, repetition transmission configurations, and DMRS configurations in the PUSCH resource configurations in all the message are different.

Figure 5:
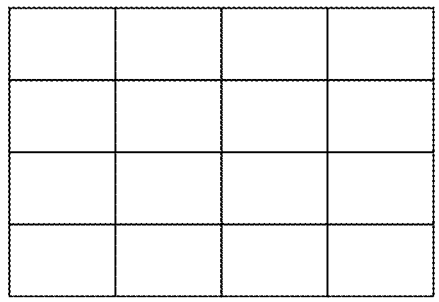
FIG. 5 is a schematic diagram of a plurality of PUSCH resource configurations according to an embodiment of this application.
Figure 5:
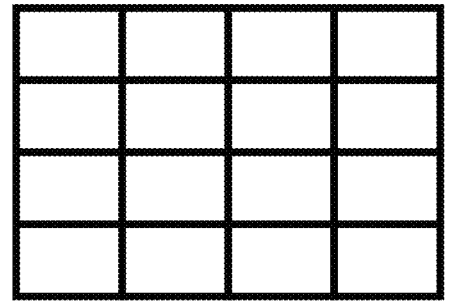
Figure 5:
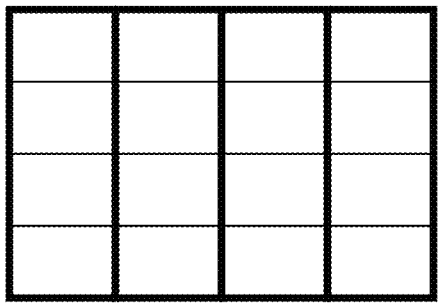
Figure 5:
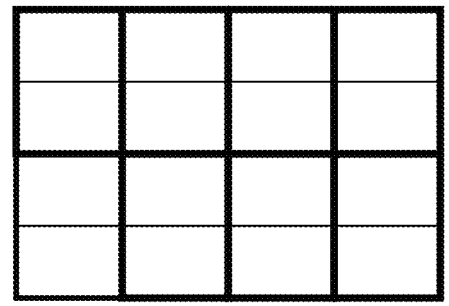

As shown in FIG. 5, sequence numbers of PUSCH time-frequency resource configurations included in three different PUSCH resource configurations are represented by using 0, 1, and 2. PUSCH transmission units in the PUSCH time-frequency resource configurations 0 to 2 are the same, and the PUSCH transmission unit is represented by using a minimum square in FIG. 5. However, PUSCH transmission occasion sizes of the PUSCH resource configurations 0 to 2 are different. The PUSCH transmission occasion size is represented by using a bold square in FIG. 5. A PUSCH transmission occasion of the PUSCH resource configuration 0 includes one PUSCH transmission unit, a PUSCH transmission occasion of the PUSCH resource configuration 1 includes two adjacent PUSCH transmission units in frequency domain, and a PUSCH transmission occasion of the PUSCH resource configuration 2 includes four adjacent PUSCH transmission units in frequency domain. The PUSCH transmission units in the PUSCH time-frequency resource configurations 0 to 2 may be a common parameter, and is specified in a protocol or carried in a first message. The PUSCH transmission occasions of the PUSCH time-frequency resource configurations 0 to 2 need to be separately configured in different messages. One or more of the following configurations: MCSs, TBSs, repetition transmission configurations, or DMRS configurations of the PUSCH resource configurations 0 to 2 are also different. To be specific, a plurality of PUSCH resource configurations are distinguished by using different DMRS ports and/or DMRS sequences. A DMRS port and/or a DMRS sequence are/is associated with a PUSCH transmission occasion size, an MCS, a TBS, and a quantity of times of repetition transmission.

Scenario 3: A common parameter is a part or all of parameters in PUSCH time-frequency resource configuration parameters.

Time division multiplexing is performed on PUSCH transmission occasions of a plurality of PUSCH resource configurations. The PUSCH time-frequency resource configuration parameter includes a PUSCH time domain resource configuration parameter and a PUSCH frequency domain resource configuration parameter. The common parameter is a part or all of the configuration parameters in the PUSCH time domain resource configuration and the PUSCH frequency domain resource configuration. One or more of the following configurations: remaining configuration parameters other than the common parameter in PUSCH time domain resource configurations and PUSCH frequency domain resource configurations, MCSs, TBSs, repetition transmission configurations, or DMRS configurations in all PUSCH resource configurations are different.

Figure 6:
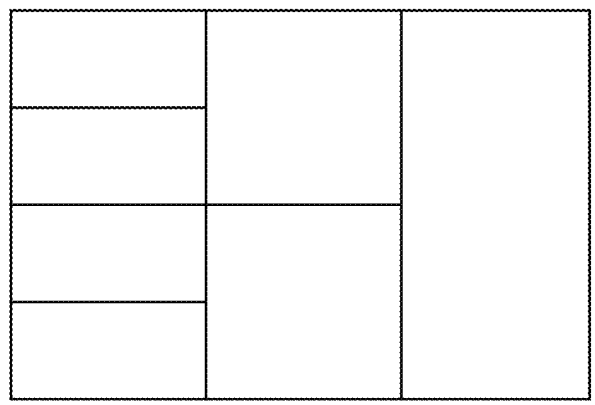
FIG. 6 is another schematic diagram of a plurality of PUSCH resource configurations according to an embodiment of this application.

As shown in FIG. 6, sequence numbers of three different PUSCH resource configurations are represented by using 0, 1, and 2. The PUSCH resource configurations 0 to 2 have a same PUSCH transmission occasion time domain length configuration parameter, a same quantity of PUSCH transmission occasions on which time division multiplexing is performed, a same frequency domain start position configuration parameter, and a same DMRS configuration parameter. PUSCH transmission occasion time domain start position configuration parameters, PUSCH transmission occasion frequency domain length configuration parameters, quantities of PUSCH transmission occasions on which frequency division multiplexing is performed, MCSs, or TBSs in all the PUSCH resource configurations are different.

Optionally, if a parameter of the PUSCH resource configuration 0 is the common parameter, a part of parameters of a frequency domain resource configuration in another PUSCH resource configuration may not be configured in a second message, but are obtained through calculation by using a frequency domain resource configuration parameter of the PUSCH resource configuration 0. For example, a quantity of PUSCH transmission occasions on which frequency division multiplexing is performed in another PUSCH resource configuration may be obtained through calculation by using a PUSCH transmission occasion frequency domain length configuration parameter and a quantity of PUSCH transmission occasions on which frequency division multiplexing is performed in the PUSCH resource configuration 0, and a PUSCH transmission occasion frequency domain length configuration parameter in the another PUSCH resource configuration.

Optionally, if a parameter of the PUSCH resource configuration 0 is the common parameter, time domain start position configuration information in another PUSCH resource configuration may be configured relative to a time domain resource in the PUSCH resource configuration 0.

Scenario 4: A common parameter is a part or all of parameters in PUSCH time-frequency resource configuration parameters.

Time division multiplexing is performed on PUSCH transmission occasions of a plurality of PUSCH resource configurations. The common parameter of the plurality of PUSCH resource configurations is a part or all of the configuration parameters in a PUSCH time domain resource configuration and a PUSCH frequency domain resource configuration. One or more of the following configurations: remaining configuration parameters in PUSCH time domain resource configurations and PUSCH frequency domain resource configurations, MCSs, TBSs, repetition transmission configurations, or DMRS configurations in all PUSCH resource configurations are different.

Figure 7A:
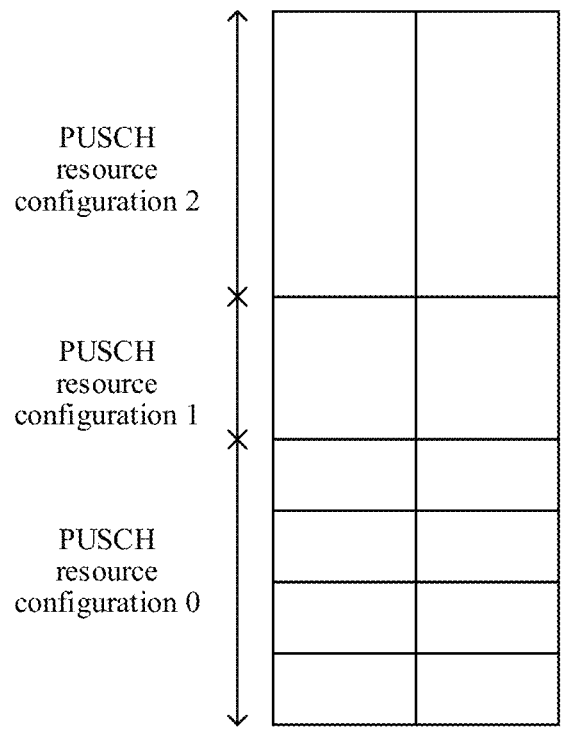
FIG. 7a is still another schematic diagram of a plurality of PUSCH resource configurations according to an embodiment of this application.

PUSCH resource configurations 0 to 2 have a same PUSCH time domain resource configuration parameter, a same DMRS configuration parameter. Frequency domain resource configuration parameters, MCSs, and TBSs in all the PUSCH resource configurations are different. In an example, PUSCH time-frequency resources configured by using the PUSCH resource configurations 0 to 2 are those shown in FIG. 7a.

Optionally, if a parameter of the PUSCH resource configuration 0 is the common parameter, for example, the parameter is obtained from a first message, frequency domain start position configuration information in another PUSCH resource configuration may be configured relative to a frequency domain resource in the PUSCH resource configuration 0.

Figure 7B:
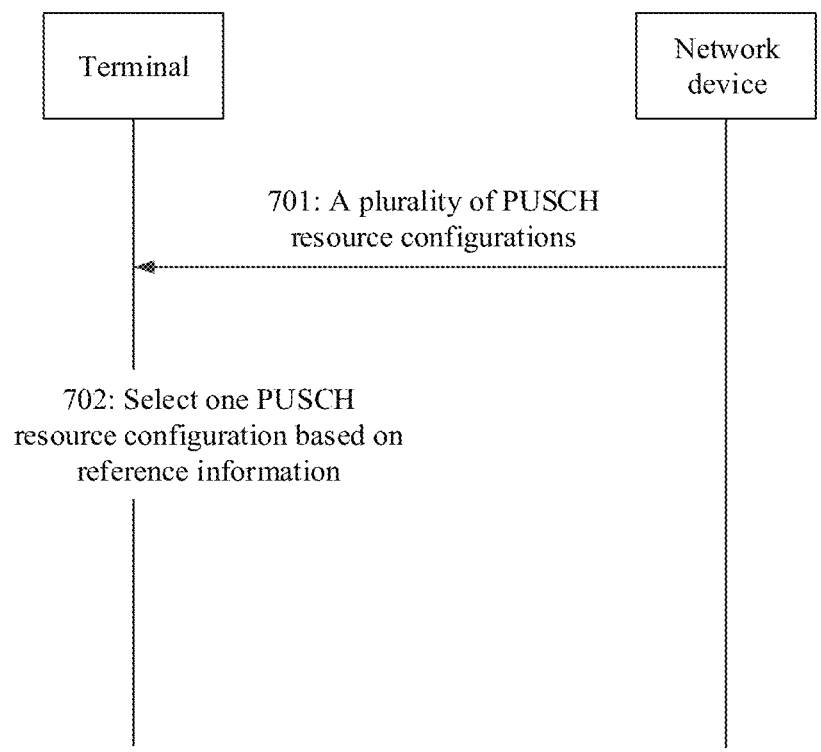
FIG. 7b is a schematic flowchart 2 of an uplink transmission resource determining method according to an embodiment of this application.

Based on a same technical concept, an embodiment of this application further provides an uplink transmission resource determining method. The method may be combined with the method provided in the foregoing embodiment, for example, with the method for obtaining one or more PUSCH resource configurations from a plurality of messages in the foregoing embodiment. The method may alternatively be used independently, and is used to select a required PUSCH resource configuration from a plurality of PUSCH resource configurations. The method is applicable to any scenario of a plurality of PUSCH resource configurations. As shown in FIG. 7b, the method is specifically described as follows: The method may be performed by a terminal.

S701: Receive a plurality of PUSCH resource configurations sent by a network device.

S702: Select one of the plurality of PUSCH resource configurations based on reference information.

The reference information may include one or more of the following information: a size of to-be-transmitted data, a path loss between a terminal and the network device, or a parameter in the plurality of PUSCH resource configurations. The reference information may further include other information. How to select one of the plurality of PUSCH resource configurations based on the reference information is described below.

In this embodiment of this application, the network device may provide a plurality of optional PUSCH resource configurations for the terminal. The plurality of PUSCH resource configurations may be in different messages, or may be in a same message. For example, the plurality of PUSCH resource configurations may be in same system information, or in same user-specific RRC information.

Alternatively, one or more PUSCH resource configurations in the plurality of PUSCH resource configurations are in system information, and the other one or more PUSCH resource configurations than the one or more PUSCH resource configurations are in user-specific RRC information.

The plurality of PUSCH resource configurations may all be PUSCH resource configurations used for PUSCH transmission in an RRC idle state or inactive state. Alternatively, the plurality of PUSCH resource configurations may all be PUSCH resource configurations used for PUSCH transmission in an RRC connected state. Alternatively, one or more PUSCH resource configurations in the plurality of PUSCH resource configurations may be PUSCH resource configurations used for PUSCH transmission in an RRC idle state or inactive state, and the other one or more PUSCH resource configurations may be PUSCH resource configurations used for PUSCH transmission in an RRC connected state.

The plurality of PUSCH resource configurations may all be PUSCH resource configurations located in initial bandwidth parts (band width parts, BWPs). Alternatively, the plurality of PUSCH resource configurations may all be PUSCH resource configurations located in active BWPs. Alternatively, one or more PUSCH resource configurations in the plurality of PUSCH resource configurations may be PUSCH resource configurations located in an initial BWP, and the other one or more PUSCH resource configurations may be PUSCH resource configurations located in an active BWP.

The network device may provide a default PUSCH resource configuration, or predefine a default PUSCH resource configuration. When one or more parameters in another PUSCH resource configuration are not configured, parameters that are the same as those in the default PUSCH resource configuration are used. A parameter in the another PUSCH resource configuration may be an independently configured parameter (that is, a value of the parameter is directly indicated by using information in the configuration, and does not need to be determined by using information other than the resource configuration), or may be determined based on a parameter and an offset value in the default PUSCH resource configuration. To be specific, a corresponding parameter value in the another PUSCH resource configuration is determined by using both the parameter and the offset value in the default PUSCH resource configuration. For example, a frequency domain start position of a PO in the default PUSCH configuration is R1, and a frequency domain start position offset in the another PUSCH resource configuration is Roffset. In this case, a frequency domain start position of a PO in the PUSCH resource configuration is R1+Roffset or R1−Roffset. The default PUSCH resource configuration may be a PUSCH resource configuration in an initial BWP, or may be a PUSCH resource configuration in an active BWP.

When there are a plurality of PUSCH resource configurations that can be selected by the terminal, the terminal may select a used PUSCH resource configuration according to the following method.

The terminal may select a PUSCH resource configuration based on one or more of the following reference information.

(1) Size of to-be-transmitted data

The to-be-transmitted data may include to-be-transmitted data and a MAC header, and/or a to-be-transmitted MAC control element (CE).

(2) Path loss between the terminal and the network device estimated by the terminal The path loss between the terminal and the network device estimated by the terminal is estimated based on a downlink reference signal determined when the terminal selects a PRACH resource. For example, the downlink reference signal is an SSB or a channel state information reference signal (CSI-RS).

(3) Parameter in a plurality of PUSCH resource configurations

For any one of the plurality of PUSCH resource configurations, a parameter in the PUSCH resource configuration may include one or more of a PUSCH power control parameter, a TBS, a PO bandwidth $M_{RB}^{PUSCH}$, a power threshold, and/or a data packet size threshold, may further include a parameter used to select a PUSCH resource configuration, and may further include another parameter described above.

Optionally, the power control parameter in the PUSCH resource configuration may include a PRACH power control parameter corresponding to a PUSCH.

The TBS may be directly configured, or may be obtained through calculation based on other configuration information. For example, the TBS is calculated based on an MCS and a resource size.

The PUSCH power control parameter includes one or more of a path loss compensation factor, a power difference $\Delta_{MsgA_{PUSCH}}$ between a PUSCH and a preamble in a Msg A, and $\Delta_{TF}$. $\Delta_{TF}$ is a power control parameter related to the MCS, where $\Delta_{TF}=10 \log_{10}((2^{BPRE+K_s}-1)*\beta_{offset}^{PUSCH})$, and $K_s$ is configured by using a parameter deltaMCS. When the deltaMCS is configured to be enabled, $K_s=1.25$. When the deltaMCS is configured to be disabled or not configured, $K_s=0$. When the PUSCH includes uplink shared channel (UL-SCH) data, $$BPRE = \sum_{r=0}^{C-1} K_r / N_{RE},$$

and $\beta_{offset}^{PUSCH}=1$. When the PUSCH is used for CSI transmission and does not include UL-SCH data, $BPRE=Q_m \cdot R/\beta_{offset}^{PUSCH}$, and $\beta_{offset}^{PUSCH}=\beta_{offset}^{CSI,1}$, where C is a quantity of code blocks transmitted on the PUSCH K is a size of a code block r, $N_{RE}$ is a quantity of REs, $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j),$$

$N_{symb,b,f,c}^{PUSCH}(i)$ is a quantity of symbols of a PO, $N_{sc,data}^{RB}(i,j)$ is a quantity of subcarriers other than a DMRS and a PTRS on a symbol j, $Q_m$ is a modulation order, and R is a code rate.

(4) Data packet size threshold of a default PUSCH resource configuration

The default PUSCH resource configuration is one of a plurality of PUSCH resource configurations.

(5) Maximum transmit power (PCMAX) of the terminal on a current carrier in a current cell (6) PRACH power control parameter, for example, a preamble received target power The foregoing parameter may be configured by the network device for the terminal, or may be specified in a protocol or predefined.

After selecting a PUSCH resource configuration, the terminal may perform two-step random access based on the selected PUSCH resource configuration.

The following describes, by using examples, several methods used by the terminal to determine a PUSCH resource configuration based on the foregoing parameters.

In one case, if a two-step random access procedure is initiated by a common control channel (CCCH) logical channel, the terminal may determine the PUSCH resource configuration in any one of the following manners.

Manner (1): The terminal randomly selects a PUSCH resource configuration whose TBS corresponding to the PUSCH resource configuration is greater than or equal to a size of to-be-transmitted data.

For example, a first PUSCH resource configuration is randomly selected from a plurality of PUSCH resource configurations, and a TBS in the first PUSCH resource configuration is greater than or equal to the size of the to-be-transmitted data.

Manner (2): The terminal selects, from a plurality of PUSCH resource configurations whose TBSs corresponding to the PUSCH resource configurations are greater than or equal to a size of to-be-transmitted data, a PUSCH resource configuration with a smallest TBS corresponding to the PUSCH resource configuration.

For example, a second PUSCH resource configuration is selected from the plurality of PUSCH resource configurations, where a plurality of first PUSCH resource configurations in the plurality of PUSCH resource configurations meet a condition that a TBS is greater than or equal to the size of the to-be-transmitted data, and the second PUSCH resource configuration is a PUSCH resource configuration with a smallest TBS in the plurality of first PUSCH resource configurations.

Manner (3): If to-be-transmitted data is less than or equal to a TBS corresponding to a default PUSCH resource configuration, the terminal selects the default PUSCH resource configuration. If to-be-transmitted data is greater than a TBS corresponding to a default PUSCH resource configuration, the terminal randomly selects a PUSCH resource configuration from PUSCH resource configurations whose TBSs corresponding to other PUSCH resource configurations are greater than or equal to a size of the to-be-transmitted data; or the terminal selects, from a plurality of PUSCH resource configurations whose TBSs corresponding to other PUSCH resource configurations are greater than or equal to a size of the to-be-transmitted data, a PUSCH resource configuration with a smallest TBS corresponding to the PUSCH resource configuration.

For example, if the to-be-transmitted data is less than or equal to the TBS corresponding to the default PUSCH resource configuration, the default PUSCH resource configuration is selected. If the to-be-transmitted data is greater than the TBS corresponding to the default PUSCH resource configuration, a first PUSCH resource configuration is randomly selected from a plurality of other PUSCH resource configurations other than the default PUSCH resource configuration, where a TBS in the first PUSCH resource configuration is greater than or equal to the size of the to-be-transmitted data; or a second PUSCH resource configuration is selected from a plurality of other PUSCH resource configurations other than the default PUSCH resource configuration, where a plurality of first PUSCH resource configurations in the plurality of PUSCH resource configurations meet a condition that a TBS is greater than or equal to the size of the to-be-transmitted data, and the second PUSCH resource configuration is a PUSCH resource configuration with a smallest TBS in the plurality of first PUSCH resource configurations.

Optionally, the TBS corresponding to the PUSCH resource configuration described in the manners (1) to (3) may be replaced with a data packet size threshold corresponding to the PUSCH resource configuration.

In another case, if a two-step random access procedure is not initiated by a CCCH logical channel, the terminal may determine the PUSCH resource configuration in any one or more of the following manners.

Manner (1): The terminal randomly selects a PUSCH resource configuration whose TBS corresponding to the PUSCH resource configuration is greater than or equal to a size of to-be-transmitted data and whose path loss is less than or equal to a path loss threshold corresponding to the PUSCH resource configuration.

For example, a first PUSCH resource configuration is randomly selected from a plurality of PUSCH resource configurations, where a TBS in the first PUSCH resource configuration is greater than or equal to the size of the to-be-transmitted data, and a path loss between the terminal and the network device is less than or equal to a path loss threshold corresponding to the first PUSCH resource configuration.

Manner (2): The terminal selects, from PUSCH resource configurations whose TBSs corresponding to the PUSCH resource configurations are greater than or equal to a size of to-be-transmitted data and whose path losses are less than or equal to path loss thresholds corresponding to the PUSCH resource configurations, a PUSCH resource configuration with a smallest TBS corresponding to the PUSCH resource configuration.

For example, a second PUSCH resource configuration is selected from a plurality of PUSCH resource configurations, where a plurality of first PUSCH resource configurations in the plurality of PUSCH resource configurations meet a condition that a TBS is greater than or equal to the size of the to-be-transmitted data and a path loss between the terminal and the network device is less than or equal to a path loss threshold corresponding to the first PUSCH resource configuration, and the second PUSCH resource configuration is a PUSCH resource configuration with a smallest TBS in the plurality of first PUSCH resource configurations.

Manner (3): The terminal selects, from PUSCH resource configurations whose TBSs corresponding to the PUSCH resource configurations are greater than or equal to a size of to-be-transmitted data and whose path losses are less than or equal to path loss thresholds corresponding to the PUSCH resource configurations, a PUSCH resource configuration with a largest path loss threshold corresponding to the PUSCH resource configuration.

For example, a third PUSCH resource configuration is selected from a plurality of PUSCH resource configurations, where a plurality of first PUSCH resource configurations in the plurality of PUSCH resource configurations meet a condition that a TBS is greater than or equal to the size of the to-be-transmitted data and a path loss between the terminal and the network device is less than or equal to a path loss threshold corresponding to the first PUSCH resource configuration, and the third PUSCH resource configuration is a PUSCH resource configuration with a largest path loss threshold corresponding to the PUSCH resource configuration in the plurality of first PUSCH resource configurations.

Manner (4): A fourth PUSCH resource configuration is selected from a plurality of PUSCH resource configurations, where the fourth PUSCH resource configuration is a PUSCH resource configuration with a largest path loss threshold corresponding to the PUSCH resource configuration in a plurality of PUSCH resource configurations whose TBSs are greater than or equal to a size of to-be-transmitted data.

For example, if there is no PUSCH resource configuration whose TBS corresponding to the PUSCH resource configuration is greater than or equal to the size of the to-be-transmitted data and whose path loss between the terminal and the network device is less than or equal to a path loss threshold corresponding to the PUSCH resource configuration, the terminal selects, from configurations whose TBS corresponding to the PUSCH resource configurations are greater than or equal to the size of the to-be-transmitted data, a PUSCH resource configuration with a largest path loss threshold corresponding to the PUSCH resource configuration.

Manner (5): A fifth PUSCH resource configuration is selected from a plurality of PUSCH resource configurations, where the fifth PUSCH resource configuration is a PUSCH resource configuration with a largest TBS corresponding to the PUSCH resource configuration in a plurality of PUSCH resource configurations whose path losses between the terminal and the network device are less than or equal to a path loss threshold.

For example, if there is no PUSCH resource configuration whose TBS corresponding to the PUSCH resource configuration is greater than or equal to the size of the to-be-transmitted data and whose path loss between the terminal and the network device is less than or equal to a path loss threshold corresponding to the PUSCH resource configuration, the terminal selects, from configurations whose path loss thresholds corresponding to the PUSCH resource configurations are greater than or equal to the path loss between the terminal and the network device, a PUSCH resource configuration with a largest TBS corresponding to the PUSCH resource configuration.

Manner (6): The terminal selects a default PUSCH resource configuration if a preset condition is met. To distinguish between the preset condition and the preset condition mentioned above, the preset condition herein is denoted as a second preset condition. The terminal randomly selects a PUSCH resource configuration from PUSCH resource configurations whose TBSs corresponding to other PUSCH resource configurations are greater than or equal to a size of to-be-transmitted data and whose path losses of the terminal are less than or equal to path loss thresholds corresponding to the PUSCH resource configurations if the second preset condition is not met.

Manner (7): The terminal selects a default PUSCH resource configuration if a second preset condition is met. The terminal selects, from PUSCH resource configurations whose TBSs corresponding to other PUSCH resource configurations are greater than or equal to a size of to-be-transmitted data and whose path losses of the terminal are less than or equal to path loss thresholds corresponding to the PUSCH resource configurations, a PUSCH resource configuration with a largest path loss threshold corresponding to the PUSCH resource configuration if a second preset condition is not met.

The second preset condition in the manner (6) and the manner (7) is as follows:
  A TBS corresponding to the default PUSCH resource configuration is greater than or equal to the to-be-transmitted data; and/or a path loss threshold corresponding to the default PUSCH resource configuration is greater than or equal to the path loss of the terminal; and/or the TBSs corresponding to the other PUSCH resource configurations are all less than the to-be-transmitted data, and/or the path loss thresholds corresponding to the other PUSCH resource configurations are all less than the path loss of the terminal.

The path loss threshold corresponding to the PUSCH resource configuration in the manner (1) to the manner (7) may be represented in any one of the following forms:

$P_{CMAX}$-preambleReceivedTargetPower-$\Delta_{MsgA_{PUSCH}}$-10 $\log_{10}(2^{\mu}M_{RB}^{PUSCH})$-$\Delta_{TF}$, $P_{CMAX}$-preambleReceivedTarget-Power-$\Delta_{MsgA_{PUSCH}}$-power threshold corresponding to the PUSCH resource configuration, or a difference obtained by subtracting one or more of items 1 to 5 from $P_{CMAX}$, where the item 1 is preambleReceivedTargetPower, and is a target received power of a preamble, the item 2 is $\Delta_{MsgA_{PUSCH}}$, the item 3 is 10 $\log_{10}(2^{\mu}M_{RB}^{PUSCH})$, the item 4 is $\Delta_{TF}$, and the item 5 is the power threshold corresponding to the PUSCH resource configuration.

preambleReceivedTargetPower, $\Delta_{MsgA_{PUSCH}}$, $\mu$, $M_{RB}^{PUSCH}$, $\Delta_{TF}$ and power thresholds corresponding to any two of a plurality of PUSCH resource configurations may be the same or may be different. These parameters may be independently configured for each PUSCH resource configuration, or may be common parameters of the plurality of PUSCH resource configurations. $\mu$ is a parameter representing a subcarrier spacing of a PUSCH.

Optionally, the TBS corresponding to the PUSCH resource configuration described in the manners (1) to (7) may be replaced with a data packet size threshold corresponding to the PUSCH resource configuration. It should be noted that examples in each application scenario in this application show only some exemplary implementations and are intended for better understanding and describing a method in this application. Persons skilled in the art may obtain examples of some evolution forms based on the reference signal indication method provided in this application.

In the foregoing embodiments provided in this application, a method provided in embodiments of this application is separately described from perspectives of the network device, the terminal device, and interaction between the network device and the terminal device. To implement functions in the foregoing method provided in embodiments of this application, the network device and the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraint conditions of the technical solutions.

Figure 8:
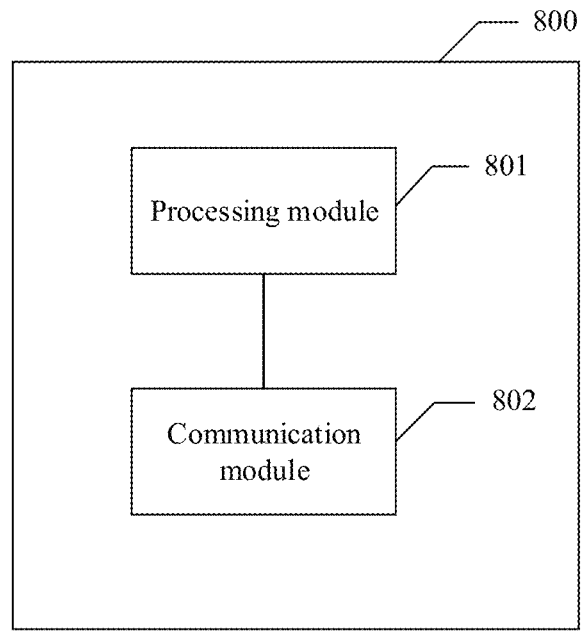
FIG. 8 is a schematic diagram of a structure of an uplink transmission resource determining apparatus according to an embodiment of this application.

As shown in FIG. 8, based on a same technical concept, an embodiment of this application further provides an apparatus 800. The apparatus 800 may be a terminal device or a network device, an apparatus (for example, a chip or a chip system) in the terminal device or the network device, or an apparatus that can be used with the terminal device or the network device. In a design, the apparatus 800 may include modules that are in a one-to-one correspondence with the methods/operations/steps/actions performed by the terminal device or the network device in the foregoing method embodiments. The modules may be implemented by using a hardware circuit, software, or a combination of a hardware circuit and software. In a design, the apparatus may include a processing module 801 and a communication module 802.

When the apparatus is configured to perform the method performed by the terminal device, the communication module 802 is configured to receive a first system information block (SIB) message sent by a network device, where the first SIB message includes a first physical uplink shared channel (PUSCH) resource configuration; and the processing module 801 is configured to determine whether a preset condition is met, where the communication module 802 is configured to receive a second SIB message sent by the network device when the preset condition is not met, where the second SIB message includes a second PUSCH resource configuration; and the processing module 801 is configured to determine, based on the second PUSCH resource configuration, a parameter used for uplink transmission.

The processing module 801 and the communication module 802 may be further configured to perform another corresponding step or operation performed by the terminal device in the foregoing method embodiments. Details are not described herein again.

When the apparatus is configured to perform the method performed by the network device, the processing module 801 is configured to control the communication module 802 to enable the communication module 802 to perform a receiving and/or sending function; and the communication module 802 is configured to send a first system information block (SIB) message and a second SIB message to a terminal, where the first SIB message includes a first physical uplink shared channel (PUSCH) resource configuration, and the second SIB message includes a second PUSCH resource configuration.

The processing module 801 and the communication module 802 may be further configured to perform another corresponding step or operation performed by the network device in the foregoing method embodiments. Details are not described herein again.

Module division in embodiments of this application is an example, is merely logical function division, and may be other division during actual implementation. In addition, functional modules in embodiments of this application may be integrated into one processor, or each of the modules may exist alone physically, or two or more modules are integrated into one module. The integrated module may be implemented in a form of hardware, or may be implemented in a form of a software functional module.

Figure 9:
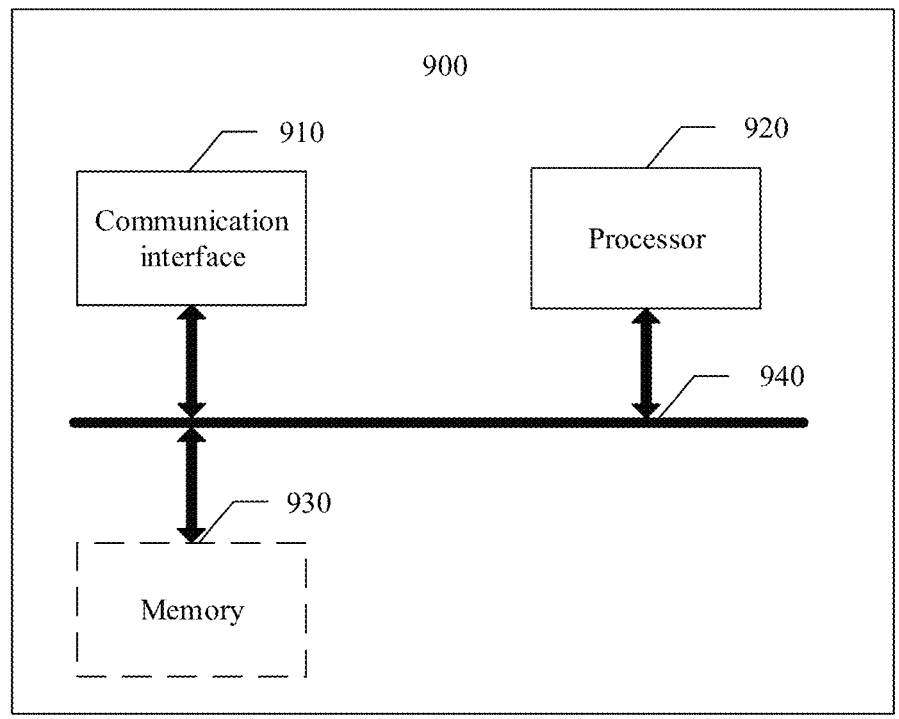
FIG. 9 is another schematic diagram of a structure of an uplink transmission resource determining apparatus according to an embodiment of this application.

FIG. 9 shows an apparatus 900 according to an embodiment of this application. The apparatus 900 is configured to implement a function of the terminal device or the network device in the foregoing method. When the function of the network device is implemented, the apparatus may be a network device, an apparatus (for example, a chip or a chip system) in the network device, or an apparatus that can be used with the network device. When the function of the terminal device is implemented, the apparatus may be a terminal device, an apparatus in the terminal device, or an apparatus that can be used with the terminal device. The apparatus may be a chip system. In this embodiment of this application, the chip system may include a chip, or may include a chip and another discrete component. The apparatus 900 includes at least one processor 920, configured to implement a function of the terminal device or the network device in a method provided in embodiments of this application. The apparatus 900 may further include a communication interface 910. In this embodiment of this application, the communication interface 910 may be a transceiver, a circuit, a bus, a module, or another type of communication interface, and is configured to communicate with another device through a transmission medium. For example, the communication interface 910 is used by an apparatus in the apparatus 900 to communicate with the another device. For example, when the apparatus 900 is a network device, the another device may be a terminal device. When the apparatus 900 is a terminal device, the another apparatus may be a network device. The processor 920 receives and sends data through the communication interface 910, and is configured to implement the method in the foregoing method embodiments. For example, when the function of the network device is implemented, the communication interface 910 is configured to send a first system information block (SIB) message and a second SIB message, where the first SIB message includes a first physical uplink shared channel (PUSCH) resource configuration, and the second SIB message includes a second PUSCH resource configuration. When the function of the terminal device is implemented, the communication interface 910 is configured to receive a first system information block (SIB) message, where the first SIB message includes a first physical uplink shared channel (PUSCH) resource configuration; the processor 920 is configured to determine whether a preset condition is met; the communication interface 910 is configured to receive a second SIB message when the preset condition is not met, where the second SIB message includes a second PUSCH resource configuration; and the processor 920 is configured to determine, based on the second PUSCH resource configuration, a parameter used for uplink transmission. The processor 920 and the communication interface 910 may be further configured to perform other corresponding steps or operations performed by the terminal device or the network device in the foregoing method embodiments. Details are not described herein again.

The apparatus 900 may further include at least one memory 930, configured to store program instructions and/or data. The memory 930 is coupled to the processor 920. Coupling in this embodiment of this application is indirect coupling or a communication connection between apparatuses, units, or modules, may be in an electrical form, a mechanical form, or another form, and is used for information exchange between the apparatuses, the units, or the modules. The processor 920 may cooperate with the memory 930. The processor 920 may execute the program instructions stored in the memory 930. At least one of the at least one memory may be included in the processor.

A specific connection medium between the communication interface 910, the processor 920, and the memory 930 is not limited in this embodiment of this application. In this embodiment of this application, the memory 930, the communication interface 920, and the transceiver 99 are connected through a bus 940 in FIG. 9. The bus is represented by a thick line in FIG. 9. A manner of connection between other components is only an example for description and is not limited thereto. The bus may be classified into an address bus, a data bus, a control bus, and the like. For ease of representation, only one thick line is used to represent the bus in FIG. 9, but this does not mean that there is only one bus or only one type of bus.

In an embodiment, when the apparatus 800 and the apparatus 900 are specifically chips or chip systems, the communication module 801 and the communication interface 910 may output or receive information in a form of a baseband signal. For example, the communication module 802 and the communication interface 910 receive a baseband signal that carries a first system information block (SIB) sent by the network device. That the network first system information block (SIB) mentioned herein is sent by the network device only indicates that a source of the information "first system information block (SIB)" is the network device and does not indicate that the information needs to be directly obtained by the apparatus 800 and the apparatus 900 from the network device, that is, an original signal (for example, a radio frequency signal) that carries the "first system information block (SIB)" and that is sent by the network device is processed by other elements or components in devices in which the apparatus 800 and the apparatus 900 are located before being transmitted to the communication interfaces of the apparatus 800 and the apparatus 900.

In an embodiment, when the apparatus 800 and the apparatus 900 are specifically devices, the communication module 802 and the communication interface 910 may output or receive a radio frequency signal. For example, the communication module 802 and the communication interface 910 receive a radio frequency signal that carries a first system information block SIB sent by the network device.

In this embodiment of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor, any conventional processor, or the like. The steps of a method disclosed with reference to embodiments of this application may be directly performed by a hardware processor, or may be performed by using a combination of hardware in the processor and a software module.

In this embodiment of this application, the memory may be a nonvolatile memory, such as a hard disk drive (HDD) or a solid-state drive (SSD), or may be a volatile memory, such as a random-access memory (RAM). The memory is any other medium that can be configured to carry or store expected program code in a form of instructions or a data structure and that can be accessed by a computer. However, the memory is not limited thereto. The memory in this embodiment of this application may alternatively be a circuit or any other apparatus that can implement a storage function, and is configured to store program instructions and/or data.

An embodiment of this application further provides a computer-readable medium. The computer-readable medium stores a computer program. When the computer program is executed by a communication apparatus, the communication apparatus is enabled to implement the foregoing uplink transmission resource determining method.

An embodiment of this application further provides a computer program product. When the computer program product is executed by a communication apparatus, the communication apparatus is enabled to implement the foregoing uplink transmission resource determining method.

Persons skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to flowcharts and/or block diagrams of a method, a device (system), and a computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn of the basic inventive concept. Therefore, the following claims are intended to be construed as to cover the preferred embodiments and all changes and modifications falling within the scope of this application.

It is clear that persons skilled in the art can make various modifications and variations to embodiments of this application without departing from the spirit and scope of embodiments of this application. This application is intended to cover these modifications and variations provided that they fall within the scope of protection defined by the following claims and their equivalent technologies.

What is claimed is:

1. An uplink transmission resource determining method, comprising:
    receiving, by a terminal, a first physical uplink shared channel (PUSCH) resource configuration from a network device, wherein the first PUSCH resource configuration corresponds to a first bandwidth part (BWP), wherein the first PUSCH resource configuration is for configuring one or more first PUSCH resources, wherein the first PUSCH resource configuration comprises a first value of a first parameter and at least one value of at least one second parameter, and wherein the first parameter is a physical random access channel (PRACH) parameter and the at least one second parameter comprises at least one PUSCH parameter;
    receiving, by the terminal, a second PUSCH resource configuration from the network device, wherein the second PUSCH resource configuration corresponds to a second BWP, wherein the second PUSCH resource configuration is for configuring one or more second PUSCH resources, and wherein the second PUSCH resource configuration comprises a second value of the PRACH parameter and does not comprise any value of the at least one PUSCH parameter;
    determining, by the terminal, the one or more second PUSCH resources based on the second value of the PRACH parameter of the second PUSCH resource configuration and the at least one value of the at least one PUSCH parameter of the first PUSCH resource configuration; and
    performing, by the terminal, an uplink transmission using the determined one or more second PUSCH resources;
    wherein the at least one second parameter comprises a modulation and coding scheme (MCS) configuration indicating a configuration of modulation and a code rate for the first PUSCH resource configuration.

2. The method according to claim 1, wherein the first parameter is usable to determine a mapping relationship between a PRACH transmission occasion and a synchronization signal block (SSB).

3. The method according to claim 1, wherein the at least one second parameter further comprises the following parameters:
    a PUSCH time domain resource configuration;
    a PUSCH frequency domain resource configuration;
    a power control configuration; and
    a reference signal configuration.

4. The method according to claim 1, wherein the at least one second parameter further comprises:
    a PUSCH time domain resource configuration.

5. The method according to claim 1, wherein the at least one second parameter further comprises:
    a PUSCH frequency domain resource configuration.

6. The method according to claim 1, wherein the at least one second parameter further comprises:
    a power control configuration.

7. The method according to claim 1, wherein the at least one second parameter further comprises:
    a reference signal configuration.

8. An uplink transmission resource determining method, comprising:
    sending, by a network device, a first physical uplink shared channel (PUSCH) resource configuration to a terminal, wherein the first PUSCH resource configuration corresponds to a first bandwidth part (BWP), wherein the first PUSCH resource configuration is for configuring one or more first PUSCH resources, wherein the first PUSCH resource configuration comprises a first value of a first parameter and at least one value of at least one second parameter, and wherein the first parameter is a physical random access channel (PRACH) parameter and the at least one second parameter comprises at least one PUSCH parameter; and
    sending, by the network device, a second PUSCH resource configuration to the terminal, wherein the second PUSCH resource configuration corresponds to a second BWP, wherein the second PUSCH resource configuration is for configuring one or more second PUSCH resources, and wherein the second PUSCH resource configuration comprises a second value of the PRACH parameter and does not comprise any value of the at least one PUSCH parameter;

wherein the at least one second parameter comprises a PUSCH time domain resource configuration indicating one or more of: a time domain start position, a time domain end position, a time domain length, a quantity of PUSCH transmission occasions (POs), or a PO time domain guard period.

9. The method according to claim 8, wherein the first parameter is usable to determine a mapping relationship between a PRACH transmission occasion and a synchronization signal block (SSB).

10. The method according to claim 8, wherein the at least one second parameter further comprises the following parameters:
a modulation and coding scheme configuration;
a PUSCH frequency domain resource configuration;
a power control configuration; and
a reference signal configuration.

11. The method according to claim 8, wherein the at least one second parameter further comprises:
a modulation and coding scheme configuration.

12. The method according to claim 8, wherein the at least one second parameter further comprises:
a PUSCH frequency domain resource configuration.

13. The method according to claim 8 wherein the at least one second parameter further comprises:
a power control configuration.

14. The method according to claim 8, wherein the at least one second parameter further comprises:
a reference signal configuration.

15. A non-transitory computer-readable storage medium having processor-executable instructions stored thereon, wherein the processor-executable instructions, when executed, facilitate:
receiving, by a terminal, a first physical uplink shared channel (PUSCH) resource configuration from a network device, wherein the first PUSCH resource configuration corresponds to a first bandwidth part (BWP), wherein the first PUSCH resource configuration is for configuring one or more first PUSCH resources, wherein the first PUSCH resource configuration comprises a first value of a first parameter and at least one value of at least one second parameter, and wherein the first parameter is a physical random access channel (PRACH) parameter and the at least one second parameter comprises at least one PUSCH parameter;

receiving, by the terminal, a second PUSCH resource configuration from the network device, wherein the second PUSCH resource configuration corresponds to a second BWP, wherein the second PUSCH resource configuration is for configuring one or more second PUSCH resources, and wherein the second PUSCH resource configuration comprises a second value of the PRACH parameter and does not comprise any value of the at least one PUSCH parameter;

determining, by the terminal, the one or more second PUSCH resources based on the second value of the PRACH parameter of the second PUSCH resource configuration and the at least one value of the at least one second parameter of the first PUSCH resource configuration; and performing, by the terminal, an uplink transmission using the determined one or more second PUSCH resources;

wherein the at least one second parameter comprises a PUSCH frequency domain resource configuration indicating one or more of: a frequency domain start position, a frequency domain end position, a frequency domain length, a quantity of PUSCH transmission occasions (POs), or a PO frequency domain guard period.

16. The non-transitory computer-readable storage medium according to claim 15, wherein the first parameter is usable to determine a mapping relationship between a PRACH transmission occasion and a synchronization signal block (SSB).

17. The non-transitory computer-readable storage medium according to claim 15, wherein the at least one second parameter further comprises the following parameters:
a modulation and coding scheme configuration;
a PUSCH time domain resource configuration;
a power control configuration; and
a reference signal configuration.

18. The non-transitory computer-readable storage medium according to claim 15, wherein the at least one second parameter further comprises:
a modulation and coding scheme configuration.

19. The non-transitory computer-readable storage medium according to claim 15, wherein the at least one second parameter further comprises:
a PUSCH time domain resource configuration.

20. The non-transitory computer-readable storage medium according to claim 15, wherein the at least one second parameter further comprises:
a power control configuration.

* * * * *